(12) United States Patent
Morikawa et al.

(10) Patent No.: US 11,116,226 B2
(45) Date of Patent: Sep. 14, 2021

(54) SHUTTER PIECE

(71) Applicant: Rheon Automatic Machinery Co., Ltd., Utsunomiya (JP)

(72) Inventors: Michio Morikawa, Utsunomiya (JP); Shigeru Hashimoto, Utsunomiya (JP); Yasunori Kondo, Utsunomiya (JP)

(73) Assignee: RHEON AUTOMATIC MACHINERY CO., LTD., Tokyo (JP)

( * ) Notice: Subject to any disclaimer, the term of this patent is extended or adjusted under 35 U.S.C. 154(b) by 642 days.

(21) Appl. No.: 15/580,448

(22) PCT Filed: Jun. 6, 2016

(86) PCT No.: PCT/JP2016/066760
§ 371 (c)(1),
(2) Date: Dec. 7, 2017

(87) PCT Pub. No.: WO2016/199720
PCT Pub. Date: Dec. 15, 2016

(65) Prior Publication Data
US 2018/0228170 A1    Aug. 16, 2018

(30) Foreign Application Priority Data

Jun. 8, 2015  (JP) .............................. JP2015-115942

(51) Int. Cl.
| | |
|---|---|
| *A21C 9/06* | (2006.01) |
| *A23P 20/25* | (2016.01) |
| *A23P 20/20* | (2016.01) |

(52) U.S. Cl.
CPC ................ *A21C 9/063* (2013.01); *A21C 9/06* (2013.01); *A23P 20/20* (2016.08); *A23P 20/25* (2016.08)

(58) Field of Classification Search
CPC . A21C 9/063; A21C 9/06; A23P 20/20; A23P 20/25
See application file for complete search history.

(56) References Cited

U.S. PATENT DOCUMENTS 5,518,391 A * 5/1996 Tashiro ................ A21C 11/103
425/132
2003/0190391 A1  10/2003 Kobayashi et al.
(Continued)

FOREIGN PATENT DOCUMENTS

| CN | 1455643 A | 11/2003 |
|---|---|---|
| CN | 100479669 C | 4/2009 |

(Continued)

OTHER PUBLICATIONS

Extended European Search Report dated May 9, 2019.
(Continued)

*Primary Examiner* — Rick K Chang
(74) *Attorney, Agent, or Firm* — Dilworth & Barrese, LLP

(57) ABSTRACT

A shutter piece has a first side surface which seals a peripheral portion of an outer skin material above an inner material, a second side surface which is located below the first side surface and contacts the outer skin material earlier than the first side surface so as to centrally gather the outer skin material toward a location above a center of the inner material, and a third side surface which is located below the first side surface and defines a portion of a pyramid-like space above the inner material when the peripheral portion of the outer skin material is sealed by the first side surface.

7 Claims, 22 Drawing Sheets

(56) References Cited

U.S. PATENT DOCUMENTS

| | | |
|---|---|---|
| 2005/0042350 A1 | 2/2005 | Kobayashi et al. |
| 2014/0234498 A1 | 8/2014 | Morikawa |
| 2014/0287113 A1 | 9/2014 | Morikawa et al. |

FOREIGN PATENT DOCUMENTS

| | | |
|---|---|---|
| CN | 202276770 U | 6/2012 |
| CN | 103717097 A | 4/2014 |
| JP | H04144630 A | 5/1992 |
| JP | 2000050854 A | 2/2000 |
| JP | 2002306149 A | 10/2002 |
| JP | 2003052299 A | 2/2003 |
| JP | 2003052349 A | 2/2003 |
| JP | 2004313072 A | 11/2004 |
| JP | 2013046606 A | 3/2013 |
| TW | 201424590 A | 7/2014 |
| WO | 2012098764 A1 | 7/2012 |

OTHER PUBLICATIONS

Chinese Office Action issued in corresponding CN201680033186.8 dated Mar. 21, 2019.
Korean Office Action dated Dec. 26, 2018 issued in Korean Patent Application No. 10-2017-7036992.
Taiwan Office Action dated Dec. 28, 2018 issued in Taiwan Patent Application No. 10721235090.
Official Action of Corresponding Taiwanese Patent Application dated Jun. 6, 2017.
Written Opinion of the International Searching Authority dated Jun. 28, 2016.
European Office Action dated Sep. 9, 2020.

* cited by examiner

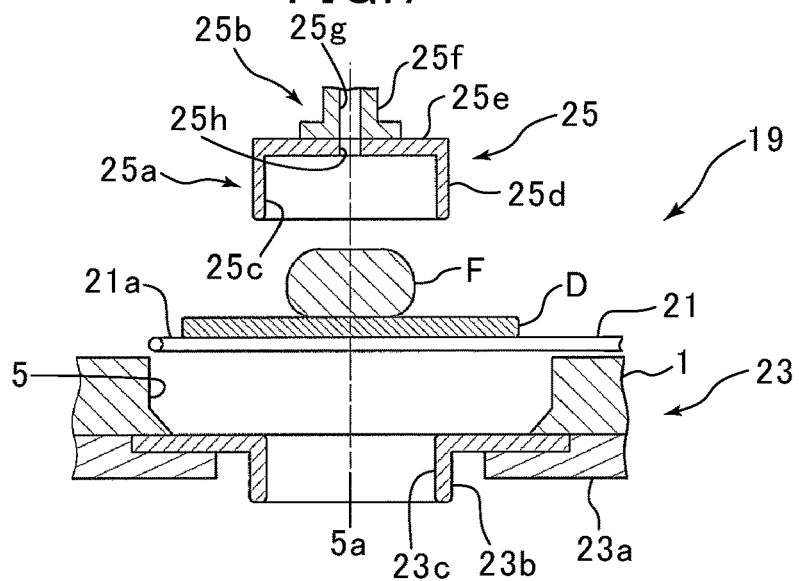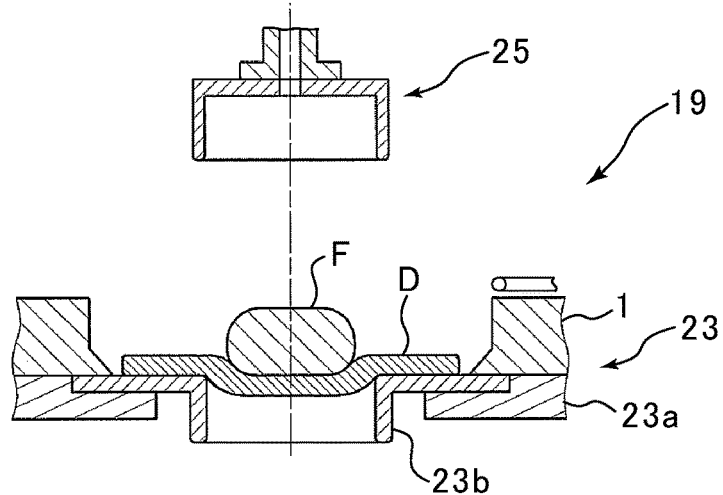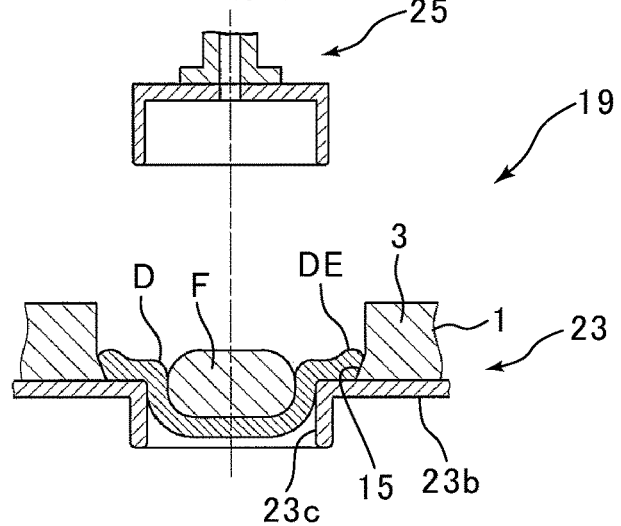

SHUTTER PIECE

TECHNICAL FIELD

The present invention relates to a shutter piece which defines a shutter set used for enveloping an inner material with a flat dough for a food product.

BACKGROUND ART

Conventionally, a forming system for forming sweet buns, such as bean-paste buns, and enveloped food products such as Chinese steamed buns (see, for example, Patent Publications 1-3) is known. Each of the forming systems described in the Patent Publications 1-3 has a shutter device by which an inner material supplied to a center of a disk-like outer skin material is enveloped with a peripheral portion of the outer skin material to form the enveloped food product. The shutter device includes a shutter set which is defined by a set of shutter pieces. The outer skin material is, for example, a dough of a bread or a Chinese steamed bun. The inner material is a mobile or solid material called as a "paste" or "filling". The forming device locates a peripheral portion of the outer skin material higher than the inner material, and then moves the shutter set from an opened state to a closed state so as to centrally gather the peripheral portion of the outer skin material toward a location above the inner material so that by sealing the outer skin material at the location above the inner material, the inner material is enveloped with the outer skin material.

PRIOR ART PUBLICATION

Patent Publication 1: Japanese Patent Laid-open Publication No. 2013-046606
Patent Publication 2: Japanese Patent Laid-open Publication No. 2003-052349
Patent Publication 3: Japanese Patent Laid-open Publication No. 2000-050854

SUMMARY OF THE INVENTION

Problem to be Solved by the Invention

The outer skin material is deformable, but has its elasticity to resist a force of centrally gathering the outer skin material. Thus, when an amount of the outer skin material having been centrally gathered to a central upper portion of the enveloped food product is small, the outer skin material at the central upper portion of the enveloped food product is pulled toward a periphery of the enveloped food product due to its elasticity so that a top of the enveloped food product may be recessed. Thus, it is desirable that a centrally gathering effect for the outer skin material by the shutter set is enhanced.

Further, when a force of centrally gathering the outer skin material is too strong, a surface of the outer skin material may get rough (be scratched) by the shutter set. Especially, the surface of the outer skin material tends to get rough during a second half of a centrally gathering process than a first half thereof.

Further, it may be necessary that the force of centrally gathering the outer skin material is sufficient from the first half of the centrally gathering process through the second half thereof.

Further, the outer skin material having been centrally gathered by the shutter set may protrude upward from the shutter set during a sealing process.

Thus, it is a first object of the present invention to provide a shutter piece, a shutter set, a shutter device, and a forming device by which the centrally gathering effect for the outer skin material is enhanced.

Further, it is a second object of the present invention to provide a shutter set, a shutter device, and a forming device by which when the outer skin material is sealed, the outer skin material is prevented from protruding upward from the shutter.

Means for Solving the Problem

To achieve the above-stated first object, a shutter piece according to the present invention is a shutter piece of a shutter set used in a shutter device by which an inner material supplied to a center of a disc-like outer skin material is enveloped with a peripheral portion of the outer skin material to form an enveloped food product, and comprises a first side surface which seals the peripheral portion of the outer skin material above the inner material; a second side surface which is located below the first side surface and contacts the outer skin material earlier than the first side surface so as to centrally gather the outer skin material toward a location above a center of the inner material; and a third side surface which is located below the first side surface and defines a portion of a pyramid-like space above the inner material when the peripheral portion of the outer skin material is sealed by the first side surface.

In this shutter piece, the second side surface contacts the outer skin material earlier than the first side surface which seals the outer skin material. Since the second side surface is located below the first side surface, the second side surface centrally gathers and stretches the outer skin material close to the inner material intensively so that the centrally gathering effect can be enhanced. Then, the outer skin material having been centrally gathered to the location above the inner material is sealed by the first side surface. When the outer skin material is sealed, the third surface located below the first side surface defines the portion of the pyramid-like space above the inner material, while the pyramid-like space is defined by the entire shutter set. Thus, the outer skin material of the enveloped food product after the sealing process is stored in the pyramid-like space so that an amount of the outer skin material having been centrally gathered to the central upper portion of enveloped food product becomes large. Thus, when the outer skin material at the central upper portion of the enveloped food product is pulled toward its periphery due to its elasticity, the stored outer skin material is stretched so that a top of the enveloped food product is prevented from being recessed.

In an embodiment of the shutter piece according to the present invention, preferably, the first side surface includes a convex peripheral edge which extends from a base-side point to a tip edge in a plan view, the second side surface includes a convex protruding edge which extends from a base-side point to a tip-side end point in the plan view, and a width between the peripheral edge and the protruding edge in the plan view becomes narrow from the base-side point toward the tip-side end point of the second side surface.

In this shutter piece, since the width in the plan view between the convex peripheral edge of the first side surface and the convex protruding edge of the second side surface becomes narrow from the base-side point toward the tip-side end point of the second side surface, a second half of the centrally gathering effect for the outer skin material which is performed by a tip-side part of the second side surface is less than a first half of the centrally gathering effect for the outer skin material which is performed by a base-side part of the second side surface. Thus, an enhanced centrally gathering force is maintained during the first half of the centrally gathering process for the outer skin material, while the centrally gathering force is reduced so as not to be too strong during the second half of the centrally gathering process for the outer skin material, so that the surface of the outer skin material can be prevented from getting rough.

In an embodiment of the above-stated shutter piece, preferably, the third side surface defining the pyramid-like space includes a triangle surface having an apex which is a lower end of the tip edge of the first side surface. Further, in another embodiment of the above-stated shutter pieces, preferably, the third side surface defining the pyramid-like space includes a portion of an inclined surface along the first side surface.

Further, to achieve the above-stated first object, a shutter piece according to the present invention is a shutter piece of a shutter set used in a shutter device by which an inner material supplied to a center of a disc-like outer skin material is enveloped with a peripheral portion of the outer skin material to form an enveloped food product and comprises a first side surface which seals the peripheral portion of the outer skin material above the inner material; and a second side surface which is located below the first side surface and contacts the outer skin material earlier than the first side surface so as to centrally gather the outer skin material toward a location above a center of the inner material; wherein the first side surface includes a convex peripheral edge which extends from a base-side point to a tip edge in a plan view; wherein the second side surface includes a convex protruding edge which extends from a base-side point to a tip-side end point in the plan view; and wherein a width between the peripheral edge and the protruding edge in the plan view becomes narrow from the base-side point toward the tip-side end point of the second side surface.

In this shutter piece, the second side surface contacts the outer skin material earlier than the first side surface which seals the outer skin material. Since the second side surface is located below the first side surface, the second side surface centrally gathers and stretches the outer skin material close to the inner material intensively so that the centrally gathering effect can be enhanced. Then, the outer skin material having been centrally gathered to the location above the inner material is sealed by the first side surface. Further, since the width in the plan view between the convex peripheral edge of the first side surface and the convex protruding edge of the second side surface becomes narrow from the base-side point toward the tip-side end point of the second side surface, a second half of the centrally gathering effect for the outer skin material which is performed by a tip-side part of the second side surface is less than a first half of the centrally gathering effect for the outer skin material which is performed by a base-side part of the second side surface. Thus, an enhanced centrally gathering force is maintained during the first half of the centrally gathering process for the outer skin material, while the centrally gathering force is reduced so as not to be too strong during the second half of the centrally gathering process for the outer skin material, so that the surface of the outer skin material can be prevented from getting rough.

In an embodiment of the shutter piece according to the present invention, preferably, the second side surface defines an inclined surface protruding from the first side surface in the plan view.

In this shutter piece, since the second side surface defines the inclined surface protruding from the first side surface, a holding force of the shutter piece for centrally gathering the outer skin material is enhanced so that the centrally gathering effect for the outer skin material can be more enhanced.

In an embodiment of the shutter piece according to the present invention, preferably, the first side surface includes a profile in the plan view which is the same along a vertical direction.

To achieve the above-stated first object, a shutter set according to the present invention comprises a combination of a plurality of the above-stated shutter pieces.

Further, to achieve the above-stated second object in addition to the above-stated first object, one of the shutter pieces has a lid member which covers an opening of the shutter set at an upper side thereof when the shutter set is in a closed state.

In this shutter set, when the shutter set is in the closed state, since the lid member covers the opening of the shutter set at the upper side thereof, the outer skin material which tends to protrude upward from the shutter set can be stopped by the lid member.

Further, to achieve the above-stated second object, a shutter set according to the present invention is a shutter set used in a shutter device by which an inner material supplied to a center of a disc-like outer skin material is enveloped with a peripheral portion of the outer skin material to form an enveloped food product and comprises a plurality of shutter pieces; wherein each of the shutter pieces includes a side surface which seals the peripheral portion of the outer skin material above inner material; and wherein one of the shutter pieces has a lid member which covers an opening of the shutter set at an upper side thereof when the shutter set is in a closed state.

In this shutter piece, when the shutter set is in the closed state, since the lid member covers the opening of the shutter set at the upper side thereof, the outer skin material which tends to protrude upward from the shutter set can be stopped by the lid member.

To achieve the above-stated first object or to achieve the above-stated second object in addition to the first object, a shutter device according to the present invention includes any one of the above-stated shutter sets.

Further, to achieve the above-stated first object or to achieve the above-stated second object in addition to the first object, a forming device according to the present invention is a forming device comprising the above-stated shutter device.

As explained above, by the shutter piece, the shutter set, the shutter device, and the forming device according to the present invention, the centrally gathering effect for the outer skin material can be enhanced.

Further, by the shutter piece, the shutter set, the shutter device, and the forming device according to the present invention, when the outer skin material is sealed, the outer skin material can be prevented from protruding upward from the shutter.

BRIEF DESCRIPTION OF THE DRAWINGS

FIG. 7 is a schematic view showing an operation of the shutter set shown in FIG. 1.

FIG. 8 is a schematic view showing the operation of the shutter set shown in FIG. 1.

FIG. 9 is a schematic view showing the operation of the shutter set shown in FIG. 1.

DESCRIPTION OF EMBODIMENTS

Referring to FIGS. 1-6, a first embodiment of a shutter set and a shutter piece according to the present invention will be explained.

Figure 1:
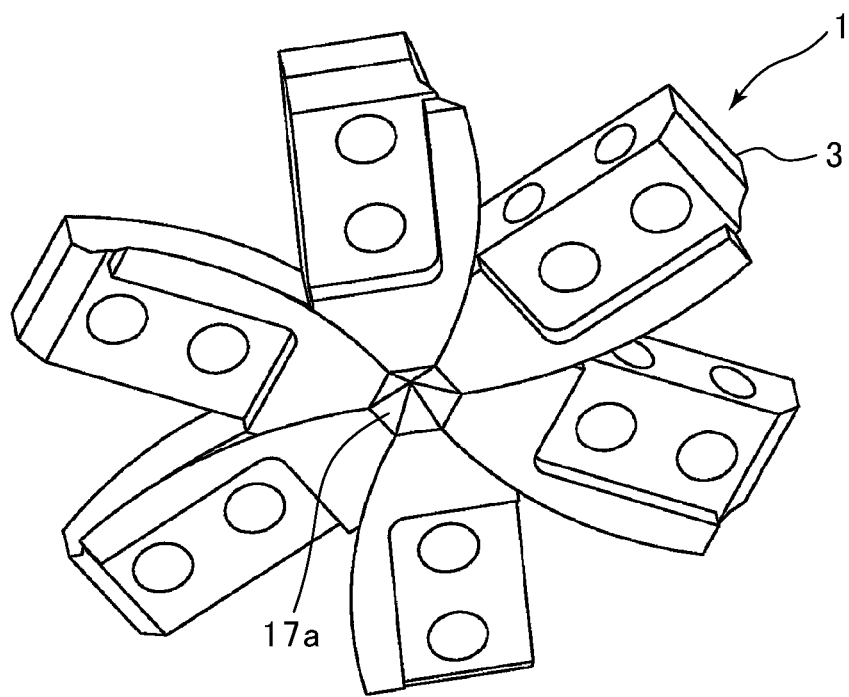
FIG. 1 is a bottom perspective view of a first embodiment of a shutter set according to the present invention.

As shown in FIG. 1, a shutter set 1 is configured by circumferentially arranging a plurality of shutter pieces 3. In the present embodiment, the shutter set 1 is defined by the six identical shutter pieces 3. The six shutter pieces 3 are configured so that the shutter set 1 is moved between a fully-closed state (see, for example, FIG. 5 (a)) and an opened state defining an opening 5 (see, for example, FIGS. 5 (b) and (c)) by synchronously swinging the shutter pieces 3. Since a mechanism of driving the shutter pieces 3 is conventionally known, an explanation thereof is omitted.

Figure 2:
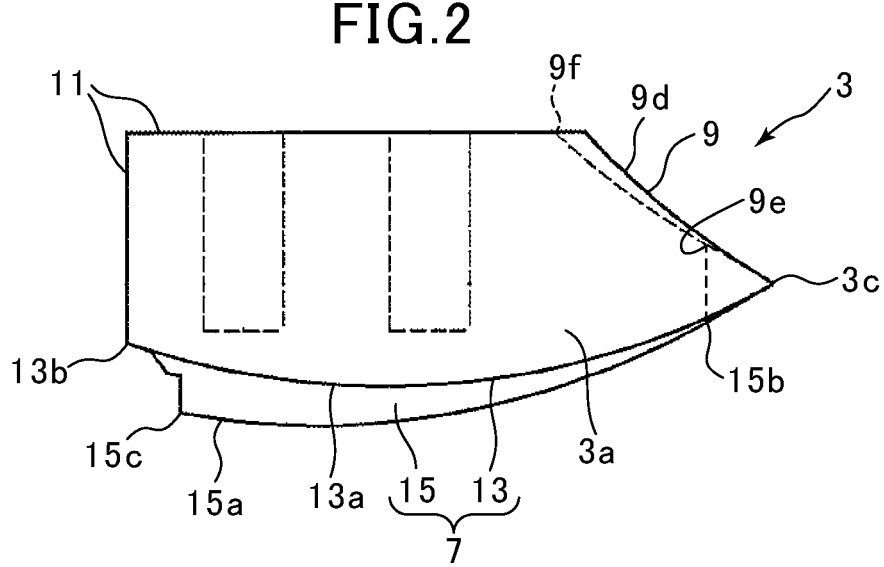
FIG. 2 is a plan view of the first embodiment of a shutter piece according to the present invention.
Figure 3:
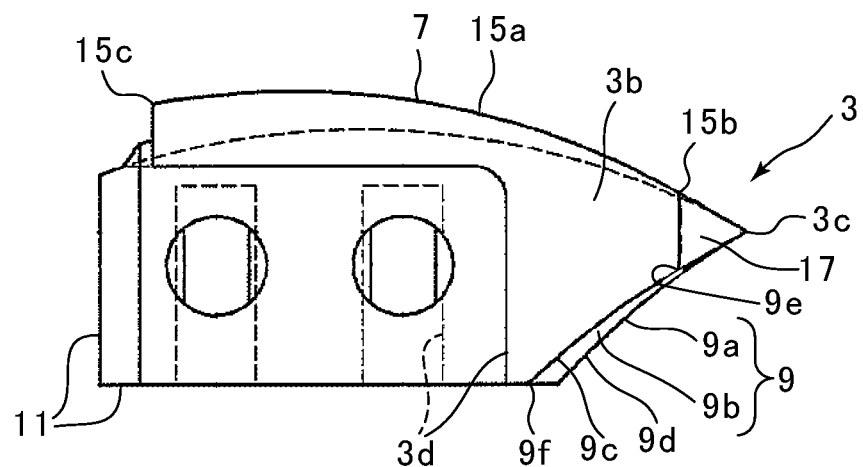
FIG. 3 is a bottom view of the shutter piece shown in FIG. 2.

As shown in FIGS. 2 and 3, the shutter piece 3 has an upper surface 3a, a lower surface 3b, and side surfaces 7, 9, 11 located between the upper surface 3a and the lower surface 3b. The side surfaces 7, 9, 11 include an opening side surface 7 defining the opening 5 (see FIGS. 5 (b) and (c)), an abutment side surface 9 defining a tip edge 3c together with the opening side surface 7, and the other side surfaces 11.

In the lower surface 3b and the other side surfaces 11, there are driving attachments 3d to which a driving part (not shown) for driving the shutter pieces 3 is attached and which are, for example, a recess and apertures. Since the driving part (not shown) and the driving attachments 3d are conventionally known, an explanation thereof is omitted.

Figure 4:
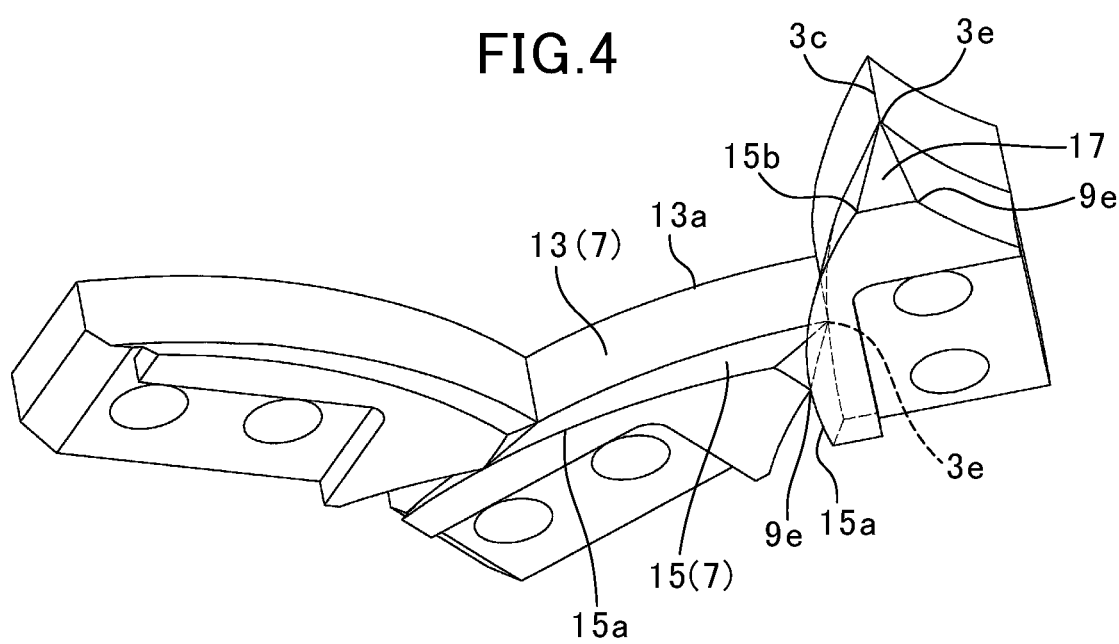
FIG. 4 is a bottom perspective view of the shutter pieces shown in FIG. 2 and combined with each other.
Figure 5:
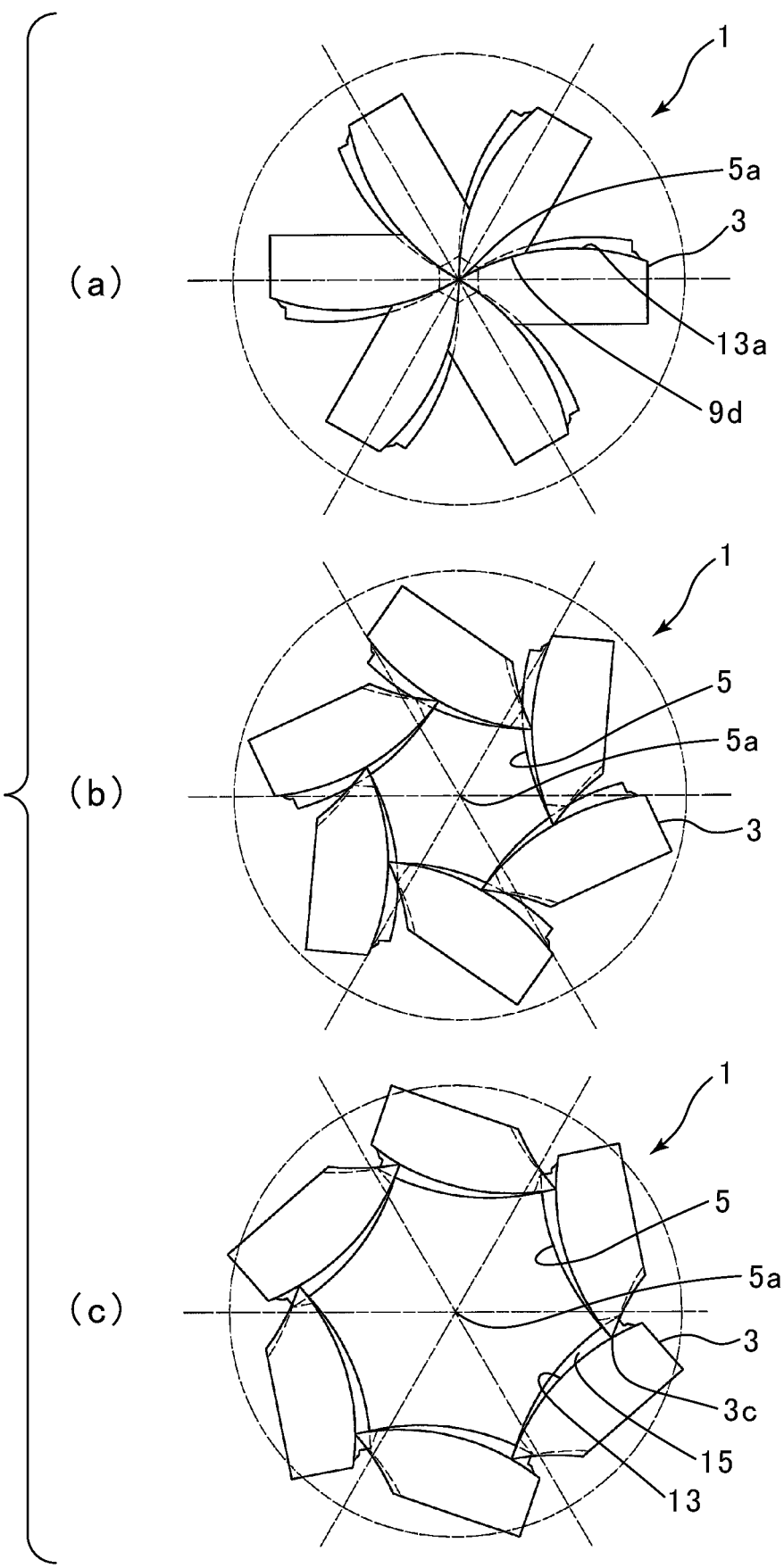
FIG. 5 is a plan view showing actions of opening and closing the shutter set shown in FIG. 1.

As shown in FIGS. 2-4, the opening side surface 7 includes an upper portion 13 and a lower portion 15 located below the upper portion 13. The upper portion 13 is defined by a curved surface having a convex arc profile in the plan view. Namely, the upper portion 13 includes an upper edge 13a which is a peripheral edge having a convex arc profile in the plan view, and has the same profile along a vertical direction. The upper edge 13a extends from a base end (base-side point) 13b to the tip edge 3c. The tip edge 3c extends vertically and linearly. A position of the tip edge 3c is preferably defined so as to pass through a center 5a of the opening 5 of the shutter set 1 when the shutter pieces 3 are swung (see FIG. 5 (a)). The upper portion 13 is movable between a closed state in which the outer skin material D is sealed (see FIG. 5 (a)) and an opened state (see FIGS. 5 (b) and (c)). In this connection, FIG. 5 (a) shows a fully-closed state.

The lower portion 15 is defined so as to protrude from the upper portion 13 in the plan view. Specifically, the lower portion 15 includes a lower edge 15a which is a protruding edge having a convex arc profile in the plan view, and the lower edge 15a includes a tip-side end point 15b located at a position which is almost the same as that of the upper edge 13a in the plan view and a base end 15c located away from the upper edge 13a toward the opening 5 in the plan view, and extends from the base end 15c to the tip-side end point 15b. Further, the tip-side end point 15b is not located at the position of the tip edge 3c in the plan view, and is offset toward the base end 15c. Preferably, the lower portion 15 is an inclined surface extending upward and obliquely from the lower edge 15a, and a width between the upper edge 13a and the lower edge 15a in the plan view becomes narrow from the base end 15c toward the tip-side end point 15b. A profile of the inclined surface (or the lower portion 15) in a vertical cross section may be a straight line, a curved line or a combination thereof.

The abutment side surface 9 includes an upper portion 9a and a lower portion 9b. The upper portion 9a and the lower portion 9b are preferably defined in concave forms so as to abut the upper portion 13 and the lower portion 15 of the opening side surface 7 of the adjacent shutter pieces 3, respectively, when the shutter pieces 3 are in the closed state. Then, in the upper surfaces 3a of the shutter pieces 3, the upper edge 13a of the upper portion 13 of the opening side surface 7 can abut an upper edge 9d of the upper portion 9a of the abutment side surface 9 of the adjacent shutter piece 3 (see FIG. 5 (a)). Further, in the lower surfaces 3b of the shutter pieces 3, the lower edge 15a of the lower portion 15 of the opening side surface 7 can abut a lower edge 9c of the lower portion 9b of the abutment side surface 9 of the adjacent shutter piece 3 (see FIG. 6 (a)). Namely, the lower edge 9c of the lower portion 9b has a concave arc profile, and includes a tip-side end point 9e located at a position which is almost the same as that of the upper edge 9d of the upper portion 9a in the plan view and a base-side point 9f located away from the upper edge 9d toward the opening 5 in the plan view. Further, the tip-side end point 9e is not located at a position along the tip edge 3c in the plan view, and is offset toward the base end point 9f.

Further, it is preferable that when the shutter pieces 3 are swung, a tip-side end point of the upper portion 9a of the abutment side surface 9 (the tip edge 3c) and a tip-side end point of the lower portion 9b of the abutment side surface 9 of the abutment side surface 9 (an edge between a lower end 3e of the tip edge 3c and the tip-side end point 9e of the lower edge 9c) always abut the upper portion 13 and the lower portion 15 of the opening side surface 7 of the adjacent shutter piece 3, respectively, so as to make no substantial clearance. Namely, it is preferable that the tip edge 3c of the shutter piece 3 always and substantially contacts the upper portion 13 of the opening side surface 7 of the adjacent shutter piece 3, while the tip-side end point 9e of the lower portion 9b of the abutment side surface 9 of the shutter piece 3 always and substantially contacts the lower edge 15a of the lower portion 15 of the opening side surface 7 of the adjacent shutter piece 3 (see FIGS. 5 and 6).

Figure 6:
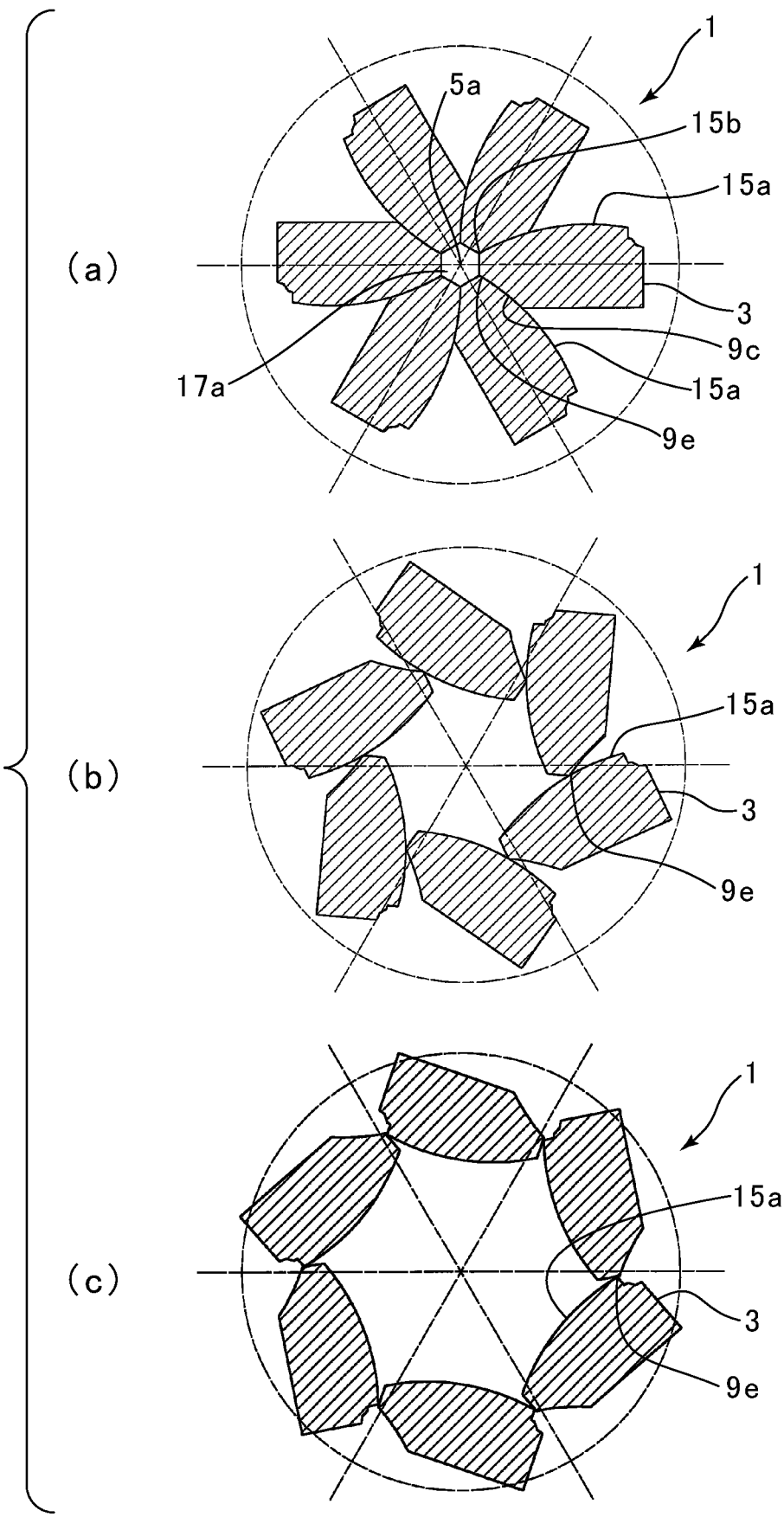
FIG. 6 is a cross-sectional view showing actions of opening and closing the shutter set shown in FIG. 1 at its lower edge.

As shown in FIGS. 4 and 6, a triangular side surface 17 located below the upper portion 13 of the opening side surface 7 is defined between the lower portion 15 of the opening side surface 7 and the lower portion 9b of the abutment side surface 9, and has vertexes, namely, the lower end 3e of the tip edge 3c, the tip-side end point 15b of the lower edge 15a of the opening side surface 7, and the tip-side end point 9e of the lower edge 9c of the abutment side surface 9. The triangular side surface 17 may be a plain surface or a curved surface. When the tip edges 3c are located at the center 5a of the opening 5 of the shutter set 1, the triangular side surface 17 defines a part of a hexagonal-pyramid-like space 17a, while the entire shutter set 1 defines the hexagonal-pyramid-like space 17a (see FIGS. 1 and 6).

Figure 11:
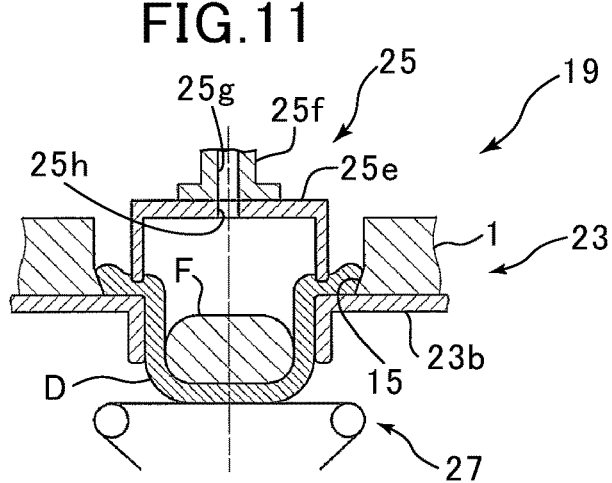
FIG. 11 is a schematic view showing the operation of the shutter set shown in FIG. 1.

Next, referring to FIGS. 7 and 11, an exemplary forming device employing a shutter device including the shutter set will be briefly explained.

As shown in FIGS. 7 and 11, a forming device 19 forms an enveloped food product P in which an inner material F is enveloped with an outer skin material D. In the forming device 19, portions relating to the present invention will be mainly explained, while explanations of the other portions which are conventionally known are omitted.

The forming device 19 includes a feeding conveyor device 21 which feeds the disk-like outer skin material D on which the inner material F is placed, a shutter device 23 located below the feeding conveyor device 21, a holding device 25 located above the feeding conveyor device 21, and a supporting device 27 located below the shutter device 23, and these devices are controlled by a control device (not shown).

The feeding conveyor device 21 has a tip portion 21a which can be extended and retracted between an extended position and a waiting position.

The shutter device 23 has a base plate 23a, an aperture plate 23b as a placement member for supporting the outer skin material D fed from the feeding conveyor device 21, and the shutter set 1 which swings as it slides on the aperture plate 23b. The aperture plate 23b has a circular central aperture 23c. A radial size and a thickness (height) of the central aperture 23c can be appropriately selected according to the enveloped food product P to be formed.

The holding device 25 has a holding member 25a and a lifting device 25b which moves the holding member 25a upward and downward. The holding member 25a has a cup shape with a downward opening 25c, a cylindrical peripheral wall 25d, and a ceiling 25e disposed on the peripheral wall 25d. In the present embodiment, the lifting device 25b has a piston rod 25f which is telescoped upward and downward, and the piston rod 25f has a through hole 25g through which compressed air is supplied downward. The ceiling 25e has a through hole 25h communicating with the through hole 25g of the piston rod 25f.

The supporting device 27 is a belt conveyor and can be lifted and lowered.

Next, referring to FIGS. 7-15, an operation of the forming device will be explained.

As shown in FIG. 7, the disk-like outer skin material D on which the inner material F is placed is conveyed by the feeding conveyor device 21 to a position at which a center of the outer skin material D corresponds to the center 5a of the opening 5 of the shutter set 1, namely, a center of the aperture 23c of the aperture plate 23b. The tip portion 21a of the feeding conveyor device 21 is in the extended position.

As shown in FIG. 8, the tip portion 21a of the feeding conveyor device 21 is retracted from the extended position to the waiting position so that the outer skin material D and the inner material F are placed on the aperture plate 23b. Even if the inner material F is placed on the aperture plate 23b so as to be offset from the center of the outer skin material D, the inner material F would roll into the aperture 23c so that the inner material F is positioned to the center of the outer skin material D.

As shown in FIG. 9, the shutter device 23 is activated to move the shutter set 1 toward the closed state. After the inclined surface, which is the lower portion 15 of the opening side surface 7 of the shutter piece 3, contacts the peripheral portion DE of the outer skin material D, it stops. This allows that a predetermined amount of the peripheral portion DE required to be sealed is evenly remained on the aperture plate 23b. Further, the outer skin material D is pushed by the shutter set 1, and the center portion of the outer skin material D is lowered into the aperture 23c of the aperture plate 23b due to weighs themselves of the outer skin material D and the inner material F. At this time, the center of the outer skin material D corresponds to the center of the aperture 23c of the aperture plate 23b. Further, since the center of the inner material F is also moved to correspond to the center of the outer skin material D, the inner material F can be placed on the center of the outer skin material D.

Figure 10:
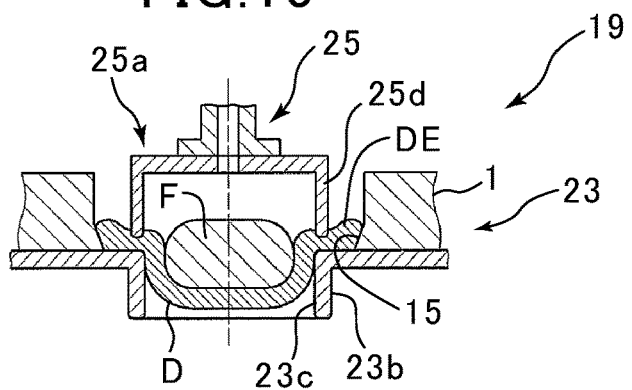
FIG. 10 is a schematic view showing the operation of the shutter set shown in FIG. 1.

As shown in FIG. 10, the holding member 25a of the holding device 25 is lowered, and stopped at an appropriate lower position according to, for example, a thickness and hardness of the outer skin material D. An annular circular peripheral wall 25d of the holding member 25a allows the peripheral portion DE of the outer skin material D to be pressed against the aperture plate 23b, without contacting the inner material F positioned on the center, so that an internal space defined between the outer skin material D and the holding member 25a is sealed.

As shown in FIG. 11, compressed air is supplied through the through holes 25g, 25h of the piston rod 25f and the ceiling 25e into the internal space so that the outer skin material D is expanded downward within the aperture 23c to be deformed to a bowl-like configuration. The supporting device 27 supports a bottom of the outer skin material D expanding downward so that the outer skin material D is prevented from being deformed more than necessary, to stabilize a shape of the outer skin material D. At this time, the position of the supporting device 27 determines the position of the head of the inner material F relative to an upper surface of the aperture plate 23b. This position of the head of the inner material F is preferably the same level as or below the aperture plate 23b.

Figure 12:
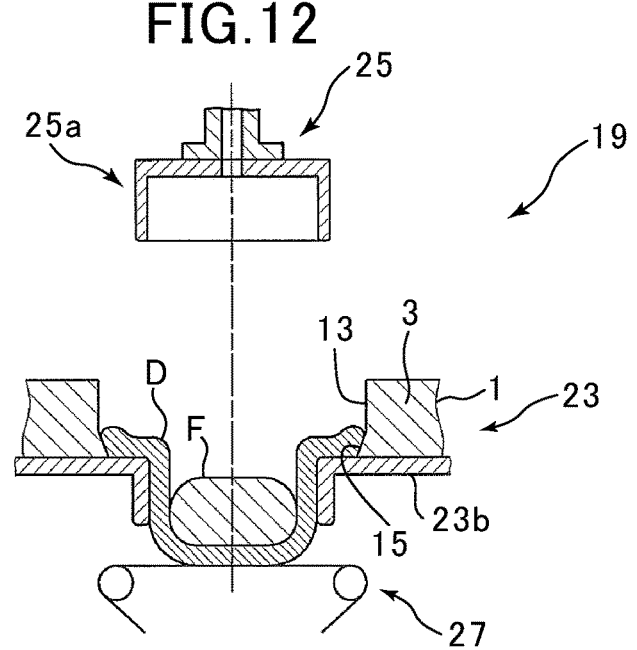
FIG. 12 is a schematic view showing the operation of the shutter set shown in FIG. 1.

As shown in FIG. 12, the holding member 25a is lifted. The shutter set 1 is moved toward the closed state again. Since the inclined surface, which is the lower portion 15 of the shutter piece 3, contacts the outer skin material D earlier than the upper portion 13 and centrally gathers the outer skin material D close to the inner material F intentionally to stretch it toward a location above the center of the inner material F, a centrally gathering effect can be enhanced. Further, since the lower portion 15 defines the inclined surface protruding from the upper portion 13, a force of holding the outer skin material D can be enhanced so that the centrally gathering effect can be more enhanced.

Figure 13:
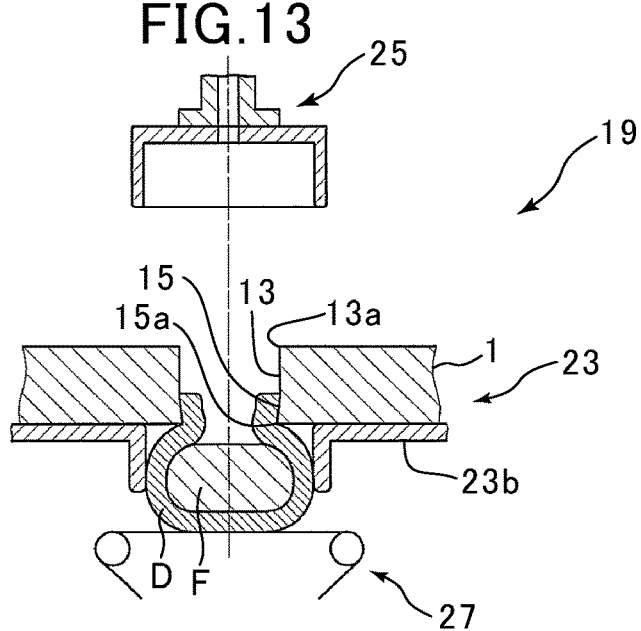
FIG. 13 is a schematic view showing the operation of the shutter set shown in FIG. 1.

As shown in FIG. 13, as the shutter set 1 proceeds with its closing action, a width in the plan view between the upper edge 13a of the upper portion 13 and the lower edge 15a of the lower portion 15 becomes narrow. As a result, the second-half of the centrally gathering effect for the outer skin material D which is performed by the tip-side part of the lower portion 15 is less than the first-half of the centrally gathering effect for the outer skin material D which is performed by the base-side part of the lower portion 15. Thus, an excess gathering (stretching) action for the outer skin material D at a location above the center of the inner material F can be prevented so that a surface of the outer skin material F can be prevented from getting rough (being stretched).

Figure 14:
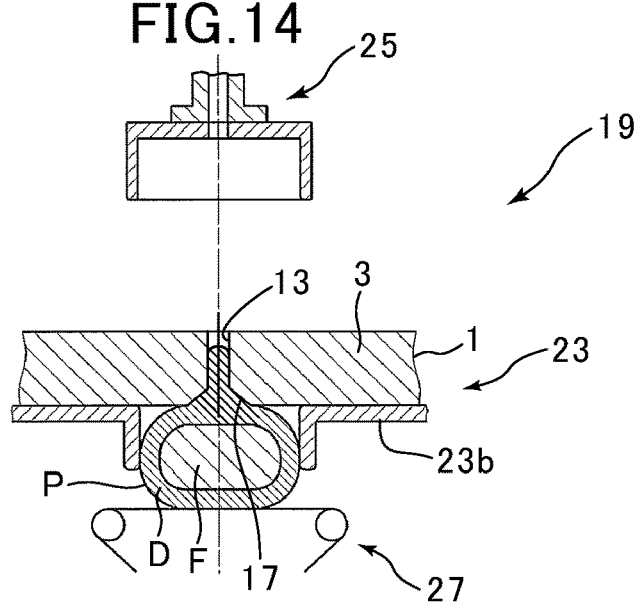
FIG. 14 is a schematic view showing the operation of the shutter set shown in FIG. 1.

As shown in FIG. 14, by closing the opening 5 of the shutter set 1, the upper portion 13 of the opening side surface 7 seals the centrally-gathered peripheral portion DE of the outer skin material D at the location above the inner material. In this connection, if the outer skin material D can be sealed, the shutter set 1 may not be moved to the fully-closed state. Further, when the shutter set 1 is not moved to the fully-closed state, a space is formed for storing the outer skin material D which tends to protrude upward from the shutter set 1, and prevents the outer skin material D from protruding upward from the shutter set. When the upper portion 13 seals the peripheral portion DE of the outer skin material D, the triangular side surface 17 of each of the shutter pieces 3 define a portion of the hexagonal-pyramid-like space 17a above the inner material F, while the entire shutter set 1 defines the hexagonal-pyramid-like space 17a. Then, the outer skin material D of the enveloped food product P is stored within the hexagonal-pyramid-like space 17a after it is sealed, so that an amount of the outer skin material D having been centrally gathered to the central upper portion of enveloped food product P is increased. Thus, when the outer skin material D at the central upper portion of enveloped food product P is pulled toward its periphery due to its elasticity, the stored outer skin material D is stretched so as to prevent the top of the enveloped food product P from being recessed (see FIG. 15).

Figure 15:
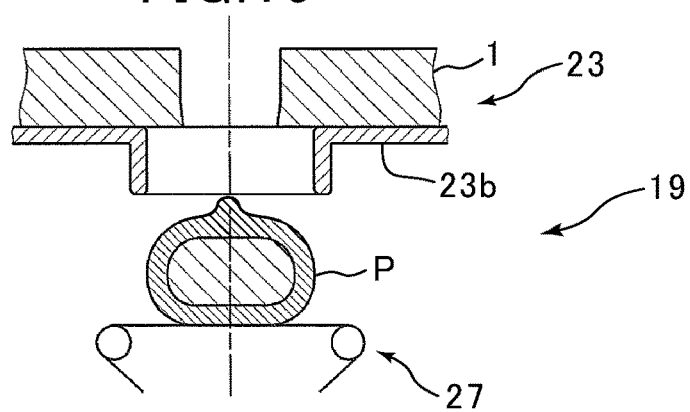
FIG. 15 is a schematic view showing the operation of the shutter set shown in FIG. 1.

As shown in FIG. 15, the shutter set 1 is moved toward the opened state to release the outer skin material D at the head of the enveloped food product P, and the supporting device 27 on which the enveloped food product P is placed is lowered.

Figure 16:
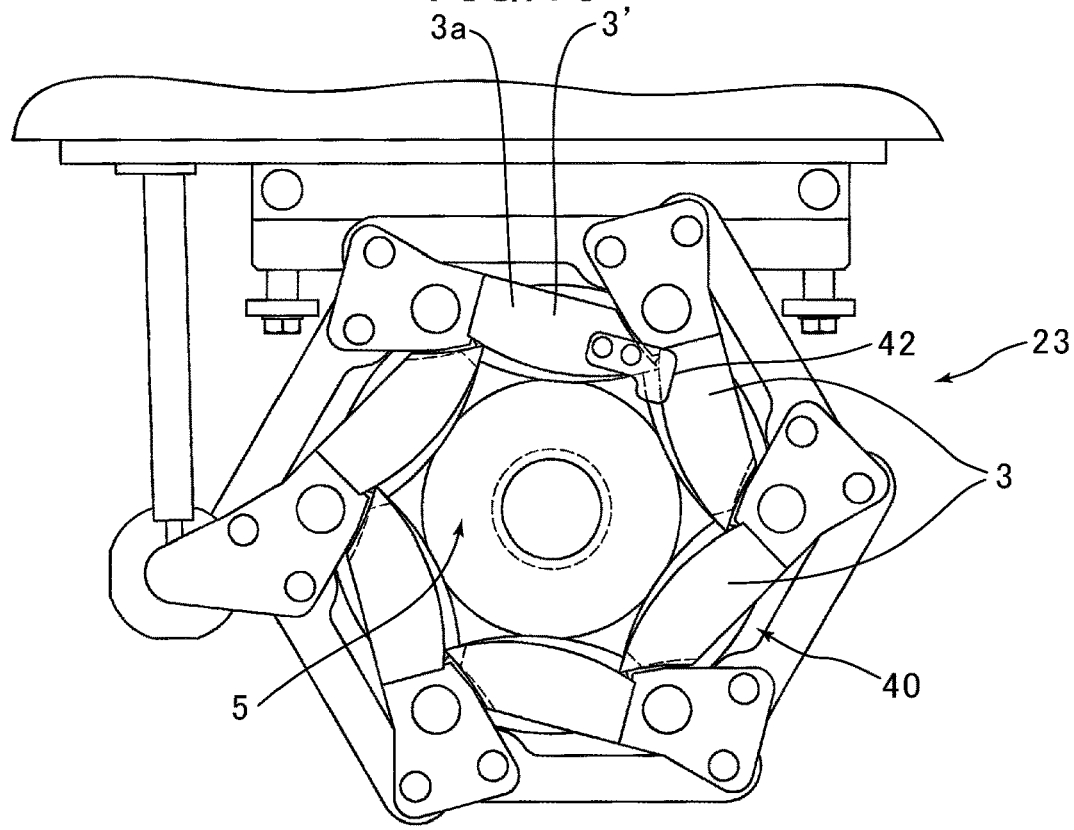
FIG. 16 is a plan view of a shutter set according to a second embodiment of the present invention in an opened state.
Figure 17:
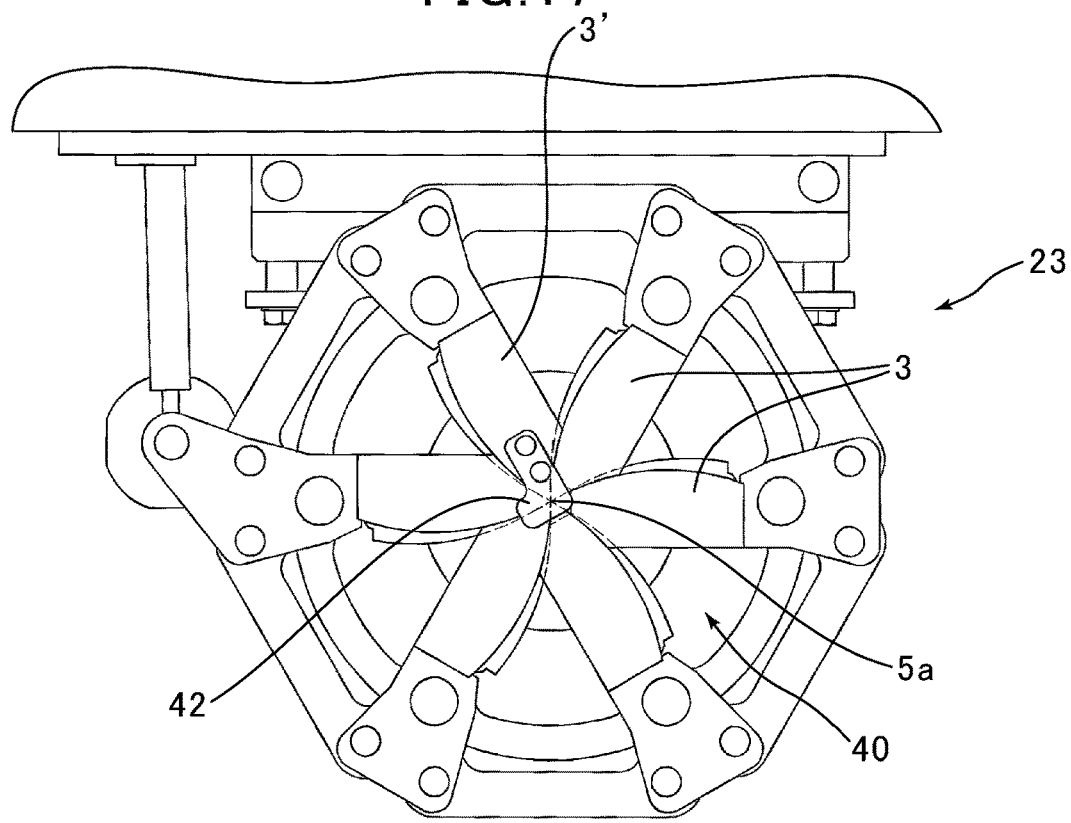
FIG. 17 is a plan view of the shutter set shown in FIG. 16 in a closed state.

Next, referring to FIGS. 16 and 17, a shutter set of a second embodiment according to the present invention will be explained.

A shutter set 40 of the second embodiment according to the present invention is similar to the shutter set 1 of the first embodiment, except that a lid member 42 is added to one 3' of the six shutter pieces and covers the opening 5 over the center 5a of the shutter set 40 when the shutter set 40 is closed.

The lid member 42 is attached on the upper surface 3a of the shutter piece 3 so as to be positioned at the center 5a of the opening 5 when the shutter set 40 is closed.

Next, referring to FIGS. 7-13 and 18-21, an operation of a forming device including the shutter set of the second embodiment according to the present invention will be explained.

The operation shown in FIGS. 7-13 is similar to that of the forming device including the shutter set 1 of the first embodiment.

Figure 18:
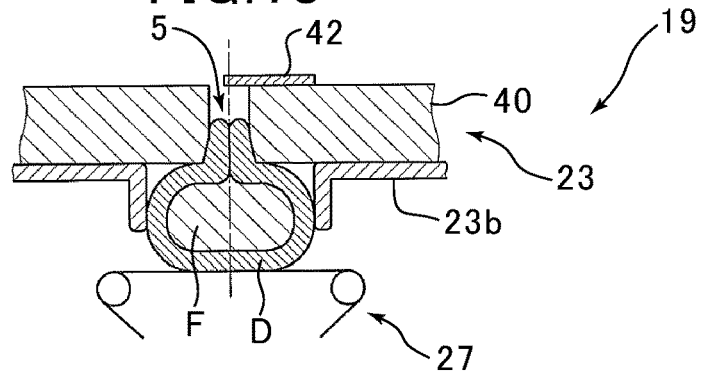
FIG. 18 is a schematic view showing an operation of the shutter set shown in FIG. 16.

As shown in FIG. 18, as the shutter set 40 comes close to the closed state, the lid member 42 is moved to the location above the opening 5.

Figure 19:
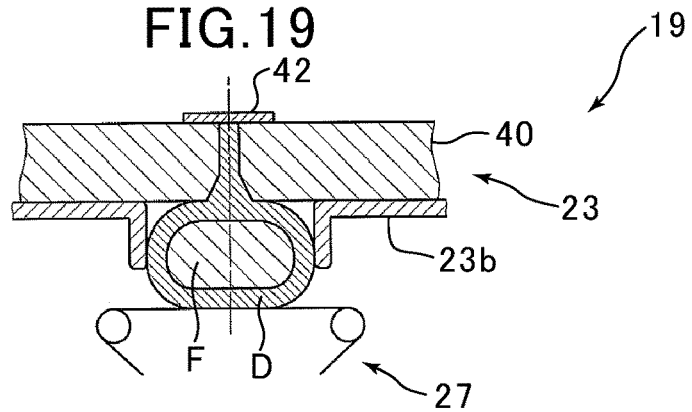
FIG. 19 is a schematic view showing the operation of the shutter set shown in FIG. 16.

As shown in FIG. 19, by closing the opening 5 of the shutter set 40, the upper portion 13 of the opening side surface 7 seals the centrally gathered peripheral portion DE of the outer skin material D at the location above the inner material F. Further, when the shutter set 40 is in the closed state, the lid member 42 completely covers the opening 5. Thus, a movement of the outer skin material D which tends to protrude upward from the shutter set 40 is stopped by the lid member 42.

Figure 20:
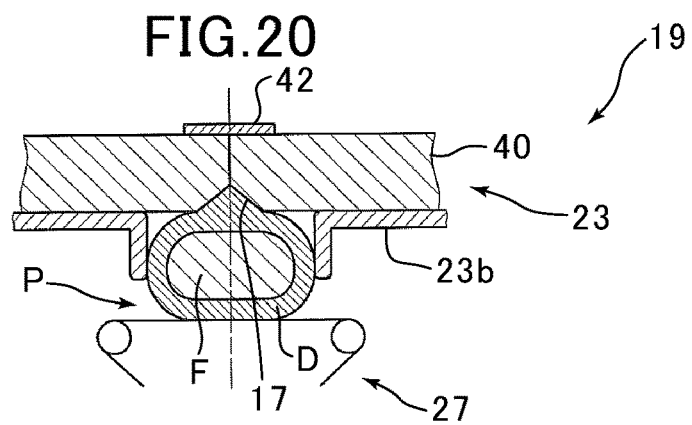
FIG. 20 is a schematic view showing the operation of the shutter set shown in FIG. 16.

As shown in FIG. 20, when the shutter set 40 is also in the fully-closed state, the lid member 42 completely covers the opening 5. Thus, the movement of the outer skin material D which tends to protrude upward from the shutter set 40 is stopped by the lid member 42. Further, when the upper portion 13 seals the peripheral portion DE of the outer skin material D, the triangular side surface 17 of each of the shutter piece 3 defines a portion of the hexagonal-pyramidlike space 17a above the inner material F, while the entire shutter set 40 defines the hexagonal-pyramid-like space 17a. Them, the outer skin material D of the enveloped food product P is stored within the hexagonal-pyramid-like space 17a after it is sealed, so that an amount of the outer skin material D having been centrally gathered to the central upper portion of enveloped food product P is increased. Thus, when the outer skin material D at the central upper portion of enveloped food product P is pulled toward its periphery due to its elasticity, the stored outer skin material D is stretched so as to prevent the top of the enveloped food product P from being recessed (see FIG. 21).

Figure 21:
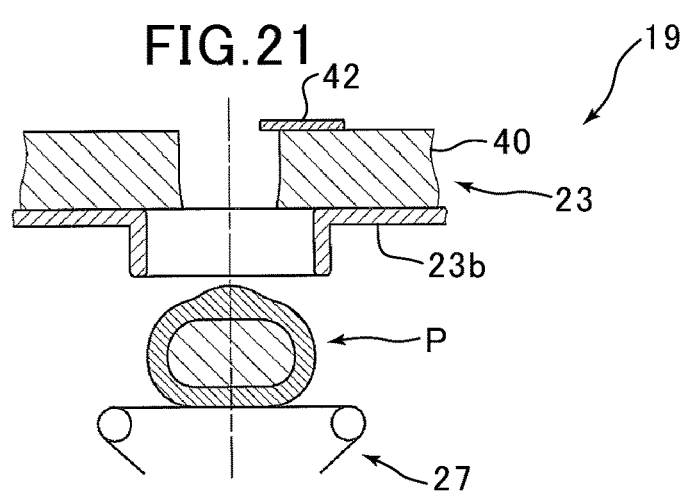
FIG. 21 is a schematic view showing the operation of the shutter set shown in FIG. 16.

As shown in FIG. 21, the shutter set 40 is moved toward the opened state to release the outer skin material D at the head of the enveloped food product P, and the supporting device 27 on which the enveloped food product P is placed is lowered.

Next, referring to FIGS. 22-27, a shutter set of a third embodiment according to the present invention will be explained.

Figure 22:
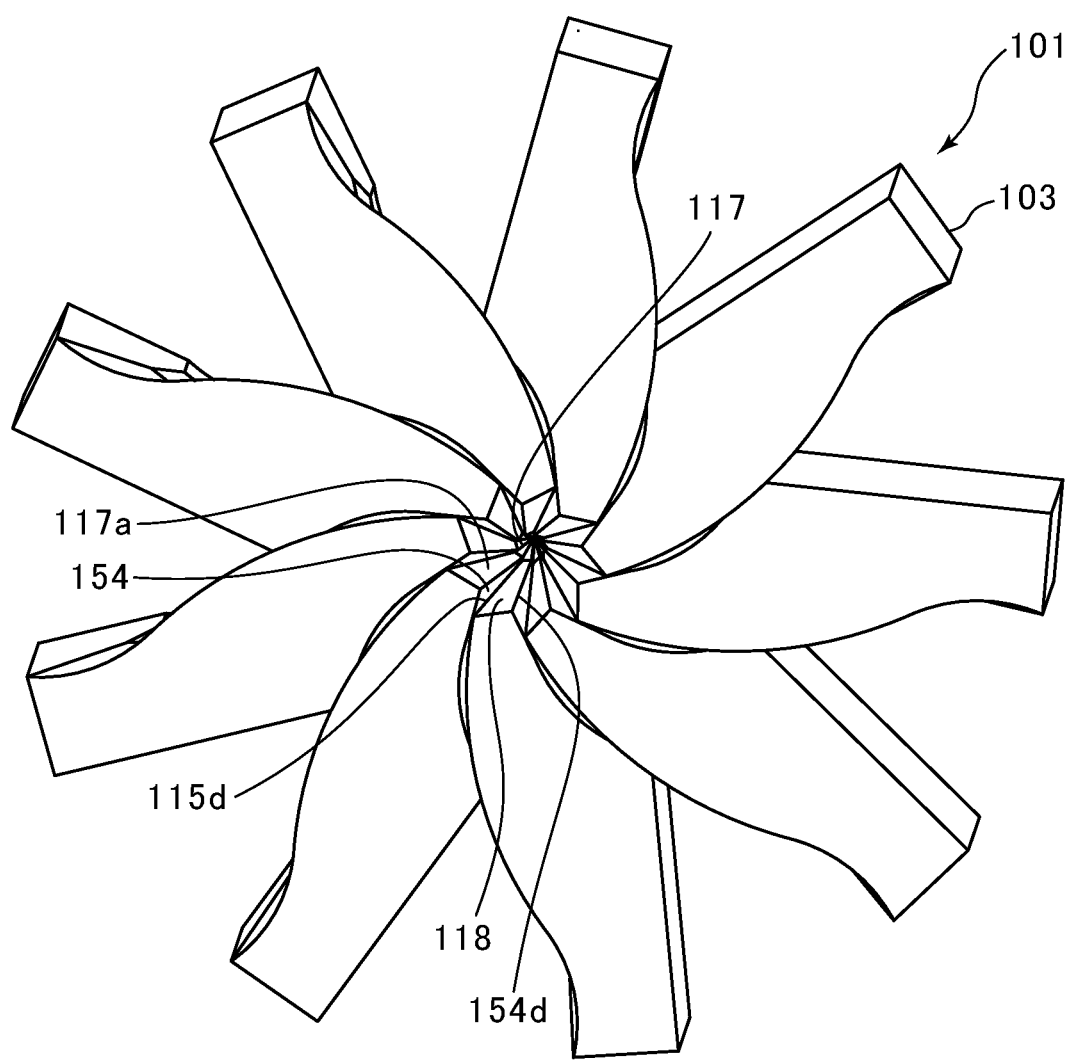
FIG. 22 is a bottom perspective view of a shutter set according to a third embodiment of the present invention.
Figure 23:
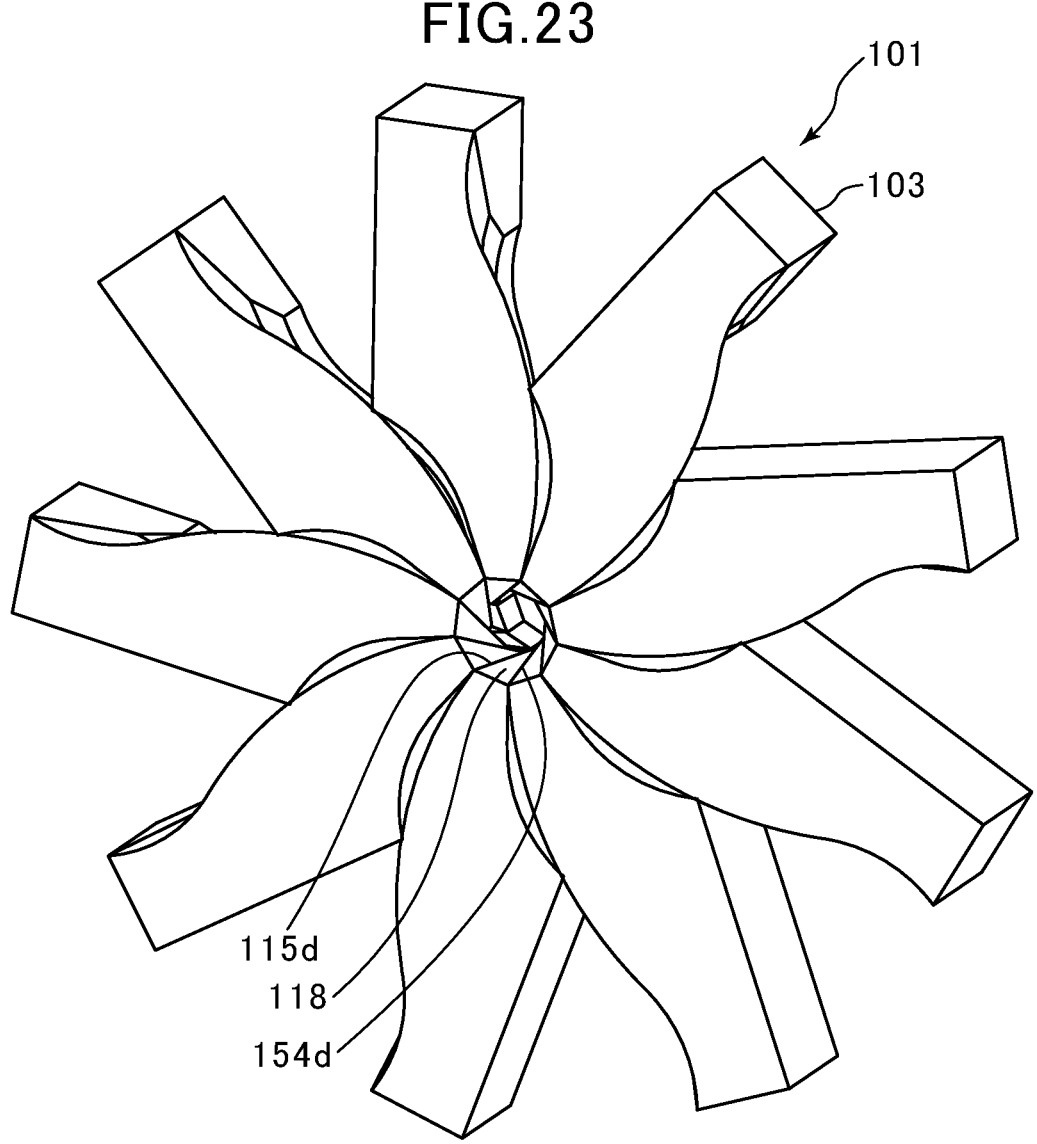
FIG. 23 is a bottom perspective view of the shutter set according to the third embodiment of the present invention.

As shown in FIGS. 22 and 23, a shutter set 101 is configured by circumferentially arranging a plurality of the shutter pieces 103. In the present embodiment, the shutter set 101 is defined by the nine identical shutter pieces 103. The nine shutter pieces 103 are configured so that the shutter set 101 is moved between a fully-closed state (see, for example, FIG. 27 (a)) and an opened state defining an opening 105 (see, for example, FIGS. 27 (b) and (c)) by synchronously swinging the shutter pieces 103. Since a mechanism of driving the shutter pieces 103 is conventionally known, an explanation thereof is omitted.

Figure 24:
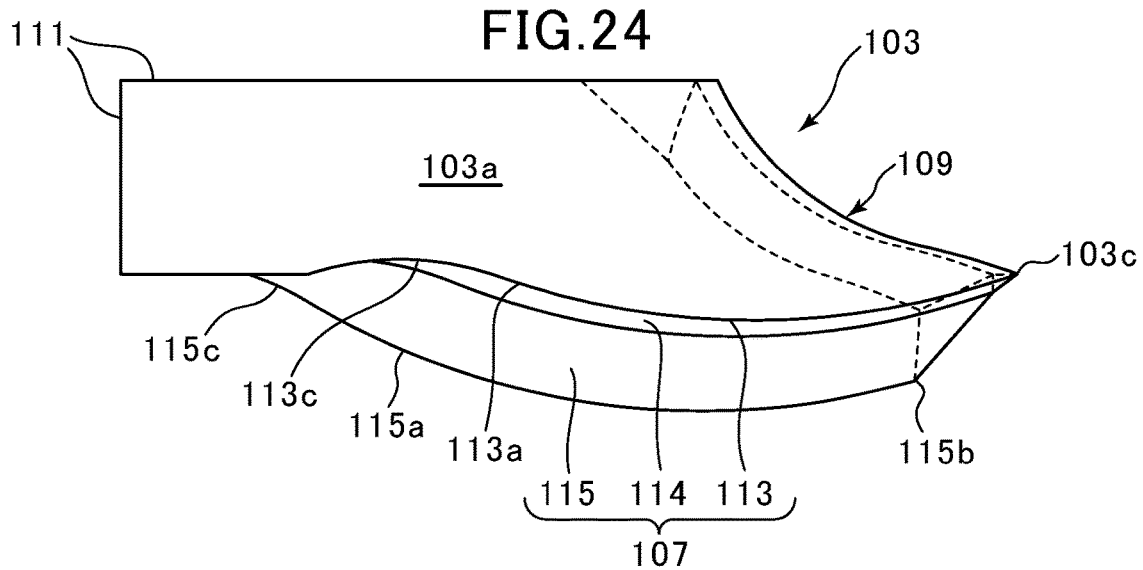
FIG. 24 is a plan view of a shutter piece according to a third embodiment of the present invention.
Figure 25:
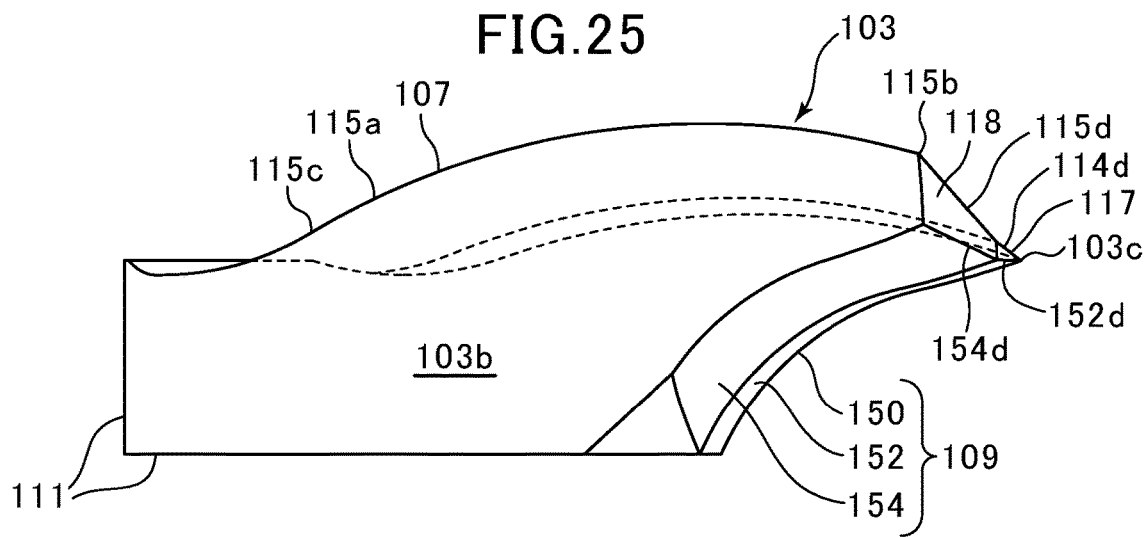
FIG. 25 is a bottom view of the shutter piece shown in FIG. 24.

As shown in FIGS. 24 and 25, the shutter piece 103 has an upper surface 103a, a lower surface 103b, and side surfaces 107, 109, 111 located between the upper surface 103a and the lower surface 103b. The side surfaces 107, 109, 111 include an opening side surface 107 defining the opening 105 (see FIGS. 27 (b) and (c)), an abutment side surface 109 defining a tip edge 103c together with the opening side surface 107, and the other side surfaces 111.

In the lower surface 103b and the other side surfaces 111, there are driving attachments (not shown) to which a driving part (not shown) for driving the shutter pieces 103 is attached and which are, for example, a recess and apertures. Since the driving part (not shown) and the driving attachments (not shown) are conventionally known, an explanation thereof is omitted.

Figure 26:
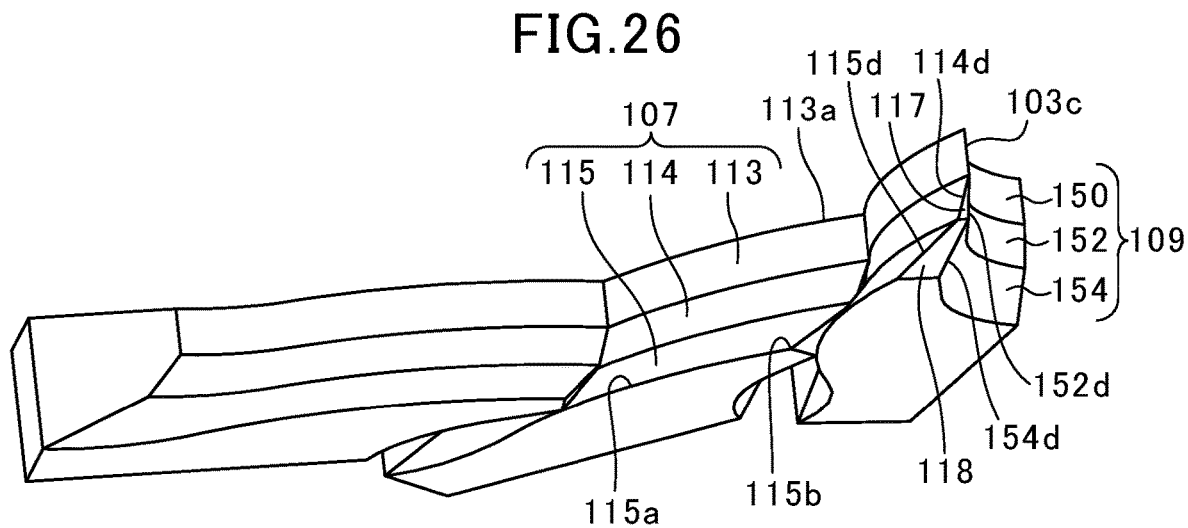
FIG. 26 is a bottom perspective view of the shutter pieces shown in FIG. 24 and combined with each other.
Figure 27:
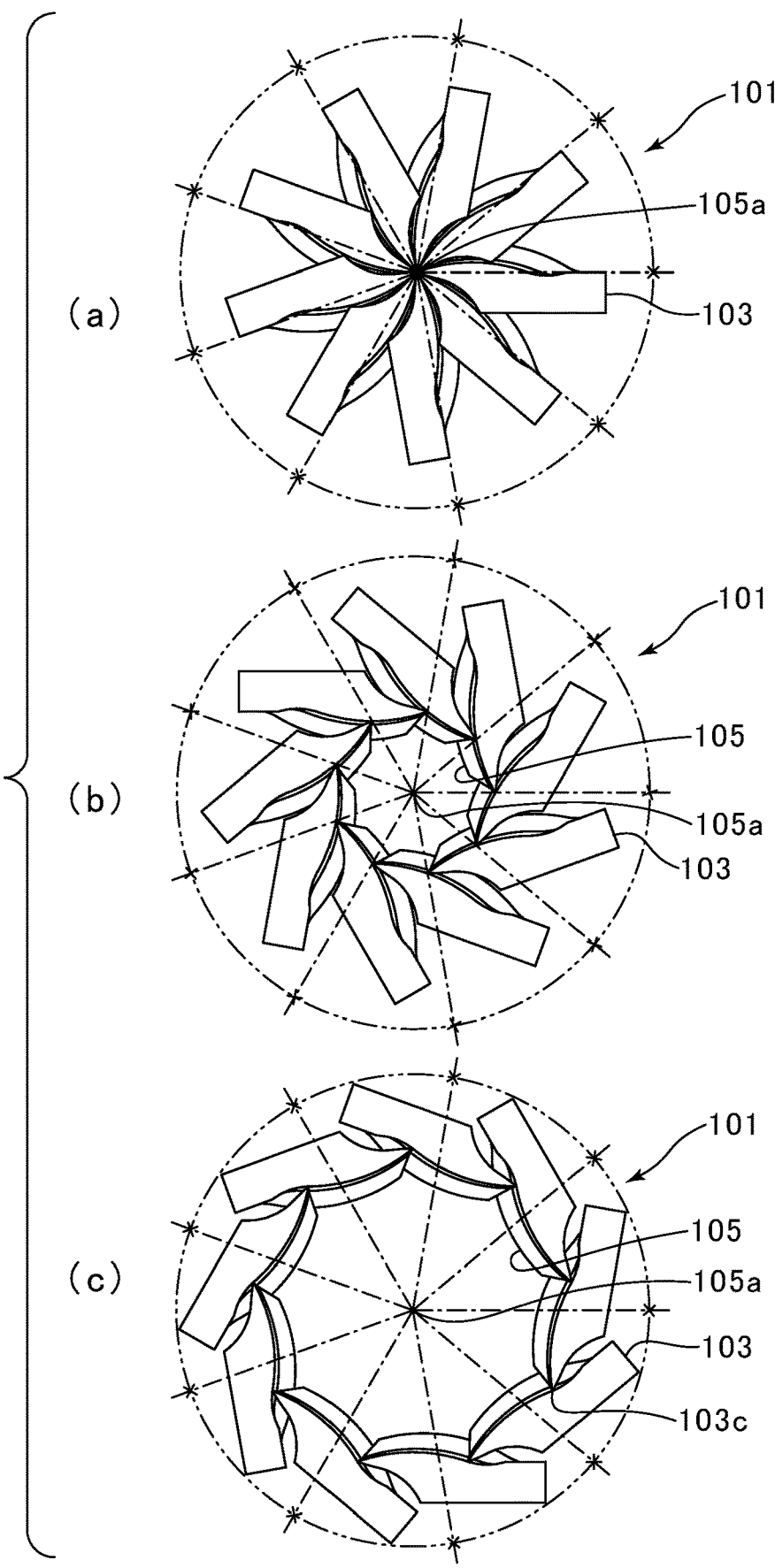
FIG. 27 is a plan view showing actions of opening and closing the shutter set shown in FIG. 22.

As shown in FIGS. 24-26, the opening side surface 107 includes an upper portion 113, a lower portion 115 located below the upper portion 113, and an intermediate portion 114 between the upper portion 113 and the lower portion 115.

A tip-side part of the upper portion 113 includes an upper edge 113a having a convex arc profile in the plan view, and has the same profile along a vertical direction. The convex upper edge 113a extends from a base-side point 113c to the tip edge 103c. The tip edge 103c extends vertically and linearly. A position of the tip edge 103c is preferably defined so as to pass through a center 105a of the opening 105 of the shutter set 101 when the shutter pieces 103 are swung (see FIG. 27 (a)).

The tip-side part of the lower portion 115 is defined so as to protrude from the upper portion 113 in the plan view (see FIG. 24). Specifically, the tip-side part of the lower portion 115 includes a lower edge 115a which is a protruding edge having a convex arc profile in the plan view. The convex lower edge 115a extends from a base-side point 115c to a tip-side end point 115b. The tip-side end point 115b and the base-side point 115c are located more inside of the opening 105 than the upper edge 113a in the plan view. Preferably, the lower portion 115 is an inclined surface extending upward and obliquely from the lower edge 115a, and a width between the upper edge 113a and the lower edge 115a in the plan view is almost the same from the base-side point 115c through the tip-side end point 115b. For example, in the plan view, a distance (width) between the upper edge 113a and the lower edge 115a is measured in a normal direction with respect to the upper edge 113a, and the distance at the tip-side end point 115b is preferably more than 90% of the maximum distance. A profile of the inclined surface (or the lower portion 115) in a vertical cross section may be a straight line, a curved line or a combination thereof.

The intermediate portion 114 is defined by a single surface connecting the upper portion 113 with the lower portion 115 along the upper portion 113. By adjusting the above-stated distance at the tip-side end point 115b, a strength of a force of centrally gathering process of the outer skin material during a second half of the centrally-gathering process can be adjusted. Further, by adjusting a position of the tip-side end point 115b toward a base side or a tip side, a timing of completion of centrally gathering the outer skin material can be adjusted. Further, by defining the intermediate portion 114, after the completion of the centrally gathering process of the outer skin material, scratches of the outer skin material by the lower portion 115 to can be reduced, while the intermediate portion 114 may be omitted.

The abutment side surface 109 includes an upper portion 150, an intermediate portion 152, and a lower portion 154. The upper portion 150 includes the tip edge 103c which is common to the upper portion of the opening side surface 107, while the intermediate portion 152 and the lower portion 154 include respective tip edges 152d, 154d. It is preferable that when the shutter pieces 103 are swung, the tip edges 103c, 152d, 154d always abut the upper portion 113, the intermediate portion 114, and the lower portion 115 of the opening side surface 107 of the adjacent shutter piece 103, respectively, so as to make no substantial clearance (see FIGS. 22, 23 and 26).

As shown in FIGS. 25 and 26, a tip edge 114d and the tip edge 152d of the intermediate portions 114, 152 extend toward a base side as they go downward from a lower end of the tip edge 103c. Thus, a triangular side surface 117 located below the upper portion 113 of the opening side surface 107 is defined between the tip edges 114d, 152d of the intermediate portions 114, 152. Further, a tip edge 115d and the tip edge 154d of the lower portions 115, 154 extend toward a base side as they go downward from lower ends of the tip edges 114d, 152d of the intermediate portions 114, 152, respectively. Thus, a trapezoidal side surface 118 is defined between the tip edges 115d, 154d of the lower portions 115, 154. Each of the triangular side surface 117 and the trapezoidal side surface 118 may be a plain surface or a curved surface.

In a state in which the shutter set 101 is opened a little from the fully-closed state (see FIG. 23), a lower end of the tip edge 115d of the lower portion 115 of the opening side surface 107 is configured so as to be at the same position as that of a lower end of the tip edge 154d of the lower portion 154 of the abutment side surface 109 of the adjacent shutter piece 103. At that time, the tip edge 154d of the abutment side surface 109 abuts the lower portion 115 of the opening side surface 107. Thus, in the state shown in FIG. 23, a concave and convex space surrounded by the nine trapezoidal side surfaces 118 and the lower portions 115 of the opening side surfaces 107 is defined. The tip edge 115d of the lower portion 115 of the opening side surface 107 is configured so as to be moved along the lower portion 154 of the abutment side surface 109 while the shutter set 101 is moved from the state shown in FIG. 23 to the state shown in FIG. 22 (see FIG. 22).

When the shutter set 101 is in the fully-closed state, the lower end of the tip edge 103c of the shutter pieces 103 is located at the center 105a. Further, the tip edge 114d of the intermediate portion 114 of the opening side surface 107 abuts the intermediate portion 152 of the abutment side surface 109. Thus, when the shutter set 101 is in the fully-closed state, a concave and convex space surrounded by the nine triangular side surfaces 117 and the intermediate portions 152 of the abutment side surfaces 109 is defined. Further, a concave and convex space surrounded by the trapezoidal side surfaces 118 and the lower portions 154 of the abutment side surfaces 109 is defined (see FIG. 22). Namely, in the state shown in FIG. 22, a pyramid-like space 117a is defined by the triangular side surfaces 117, the intermediate portions 152 of the abutment side surfaces 109, the trapezoidal side surfaces 118, and the lower portions 154 of the abutment side surfaces 109. The pyramid-like space 117a is a space which tapers toward its top and is opened downward.

Next, an operation of a forming device including the shutter set of the third embodiment according to the present invention will be explained.

A first half of the operation of the forming device including the shutter set 101 of the third embodiment is almost the same as the operation shown in FIGS. 7-11. Referring to FIGS. 28-31, a second half of the operation of the forming device will be explained.

Figure 28:
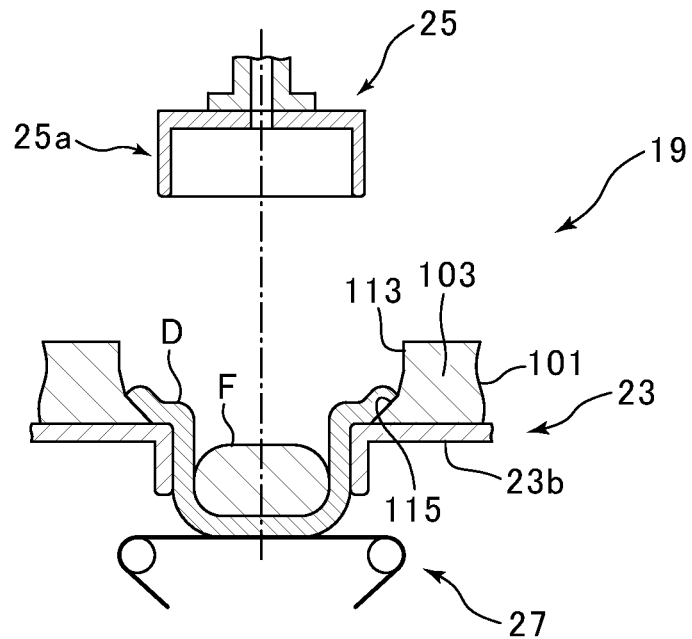
FIG. 28 is a schematic view showing an operation of the shutter set shown in FIG. 22.

As shown in FIG. 28, the holding member 25a is lifted. The shutter set 101 is moved toward the closed state again. Since the inclined surface, which is the lower portion 115 of the shutter piece 103, contacts the outer skin material D earlier than the upper portion 113 and centrally gathers the outer skin material D close to the inner material F to stretch it toward a location above the center of the inner material F intentionally, the centrally gathering effect is enhanced. Further, since the lower portion 115 defines the inclined surface protruding from the upper portion 113, the force of holding the outer skin material D can be enhanced so that the centrally gathering effect can be more enhanced.

Figure 29:
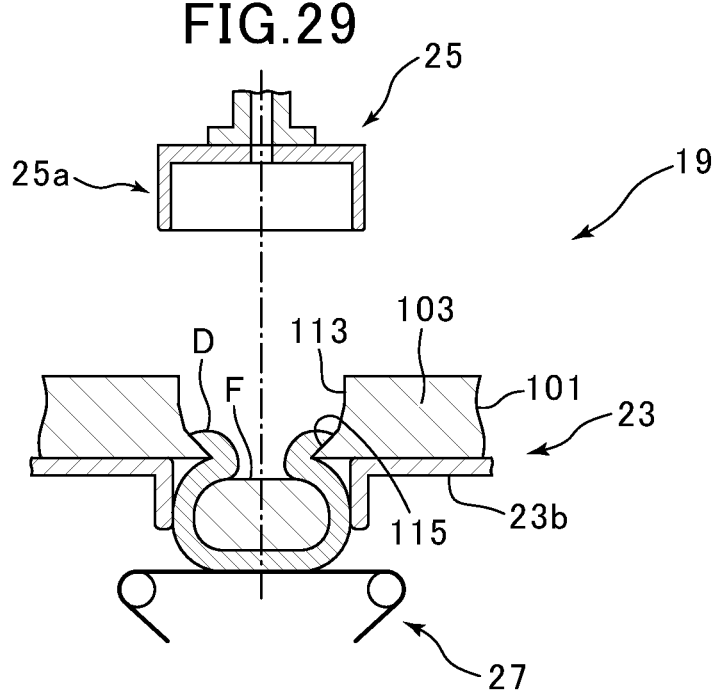
FIG. 29 is a schematic view showing the operation of the shutter set shown in FIG. 22.

As shown in FIG. 29, as the shutter set 101 proceeds with its closing action, a state in the plan view in which the lower edge 115a of the lower portion 115 protrudes more than the upper edge 113a of the upper portion 113 is maintained (see FIG. 27(b)). As a result, the second-half of the centrally gathering effect for the outer skin material D performed by the lower portion 115 is almost the same as the first-half of the centrally gathering effect for the outer skin material D performed by the lower portion 115. Thus, even if the outer skin material is less stretchable as a Chinese steamed bun and so on, the centrally gathering effect is maintained just before the sealing process so that the outer skin material D can be centrally gathered more than a case using the shutter piece 3 of the first embodiment.

Figure 30:
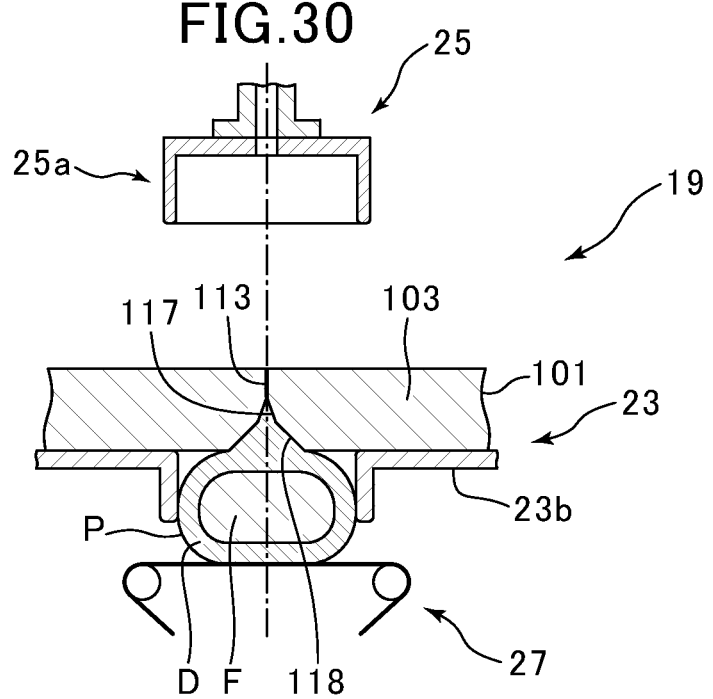
FIG. 30 is a schematic view showing the operation of the shutter set shown in FIG. 22.

As shown in FIG. 30, by closing the opening 105 of the shutter set 101, the upper portion 113 of opening side surface 107 seals the centrally gathered peripheral portion DE of the outer skin material D at the location above the inner material. In this connection, if the outer skin material D can be sealed, the shutter set 101 may not be moved to the fully-closed state. Further, when the shutter set 101 is not to be moved to the fully-closed state, a space is formed for storing the outer skin material D which tends to protrude upward from the shutter set 101, and prevents the outer skin material D from protruding upward from the shutter set. When the upper portion 113 seals the peripheral portion DE of the outer skin material D, the triangular side surface 117, the intermediate portion 114, the trapezoidal side surface 118 and the lower portion 154 of each of the shutter pieces 103 defines a portion of the pyramid-like space 117a above the inner material F, while the entire shutter set 101 defines the pyramid-like space 117a. Then, the outer skin material D of the enveloped food product P is stored within the pyramid-like space 117a after it is sealed, so that an amount of the outer skin material D having been centrally gathered to the central upper portion of enveloped food product P is increased. Thus, when the outer skin material D at the central upper portion of enveloped food product P is pulled toward its periphery due to its elasticity, the stored outer skin material D is stretched so as to prevent the top of the enveloped food product P from being recessed (see FIG. 31).

Figure 31:
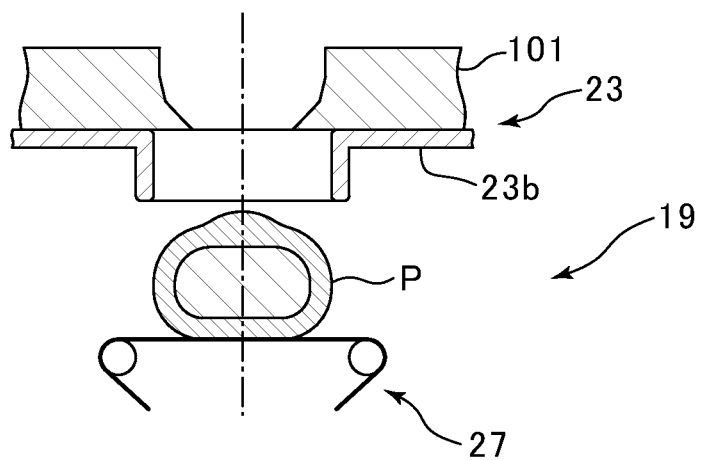
FIG. 31 is a schematic view showing the operation of the shutter set shown in FIG. 22.

As shown in FIG. 31, a shutter set 101 is moved toward the opened state to release the outer skin material D at the head of the enveloped food product P, and the supporting device 27 on which the enveloped food product P is placed is lowered.

Next, referring to FIGS. 32-38, a shutter set of a fourth embodiment according to the present invention will be explained.

Figure 32:
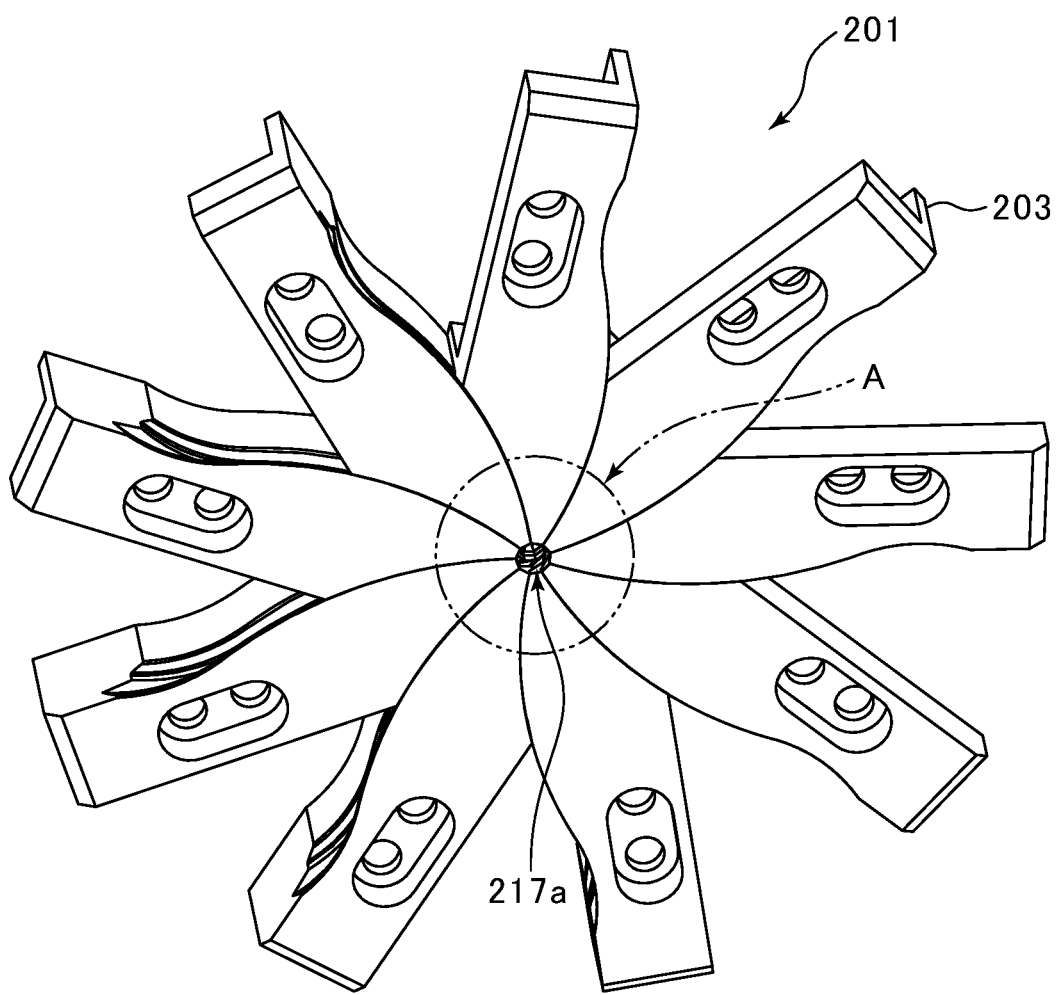
FIG. 32 is a bottom perspective view of a shutter set according to a fourth embodiment of the present invention.

As shown in FIG. 32, a shutter set 201 is configured by circumferentially arranging a plurality of shutter pieces 203. In the present embodiment, the shutter set 201 is defined by the nine identical shutter pieces 203. The nine shutter pieces 203 are configured so that the shutter set 201 is moved between a fully-closed state (see, for example, FIG. 38 (a)) and an opened state defining an opening 205 (see, for example, FIGS. 38 (b) and (c)) by synchronously swinging the shutter pieces 203. Since a mechanism of driving the shutter pieces 203 is conventionally known, an explanation thereof is omitted.

Figure 34:
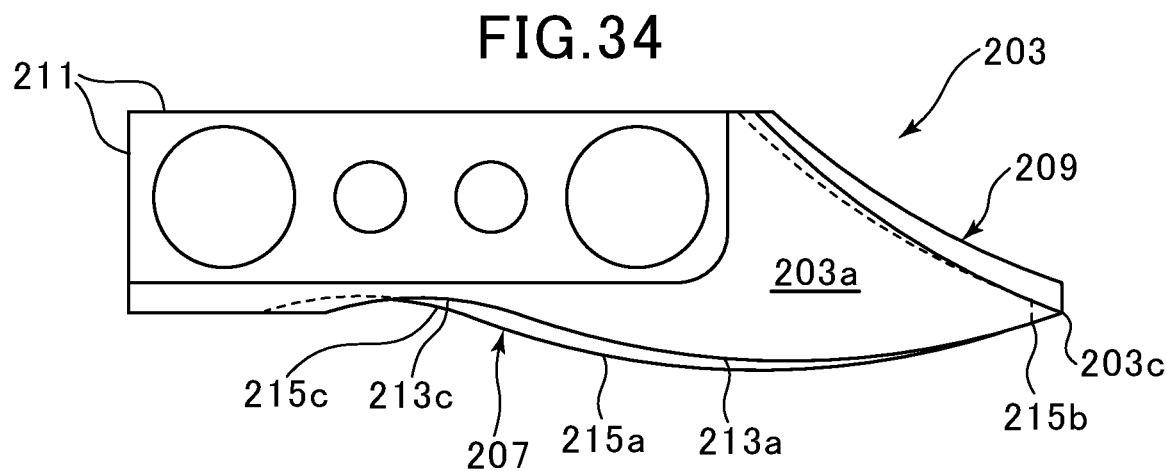
FIG. 34 is a plan view of a shutter piece according to a third embodiment of the present invention.
Figure 35:
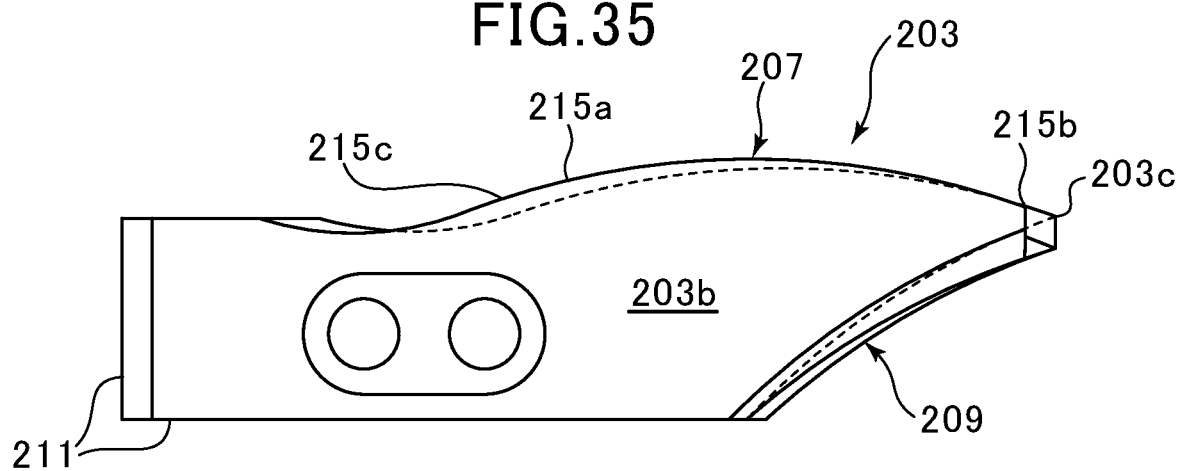
FIG. 35 is a bottom view of the shutter pieces shown in FIG. 34.

As shown in FIGS. 34 and 35, the shutter piece 203 has an upper surface 203a, a lower surface 203b, and side surfaces 207, 209, 211 located between the upper surface 203a and the lower surface 203b. The side surfaces 207, 209, 211 include an opening side surface 207 defining the opening 205 (see FIGS. 38 (b) and (c)), an abutment side surface 209 defining a tip edge 203c together with the opening side surface 207, and the other side surfaces 211.

In the lower surface 203b and the other side surfaces 211, there are driving attachments to which a driving part (not shown) for driving the shutter pieces 203 is attached and which are, for example, a recess and apertures. Since the driving part (not shown) and the driving attachments are conventionally known, an explanation thereof is omitted.

Figure 36:
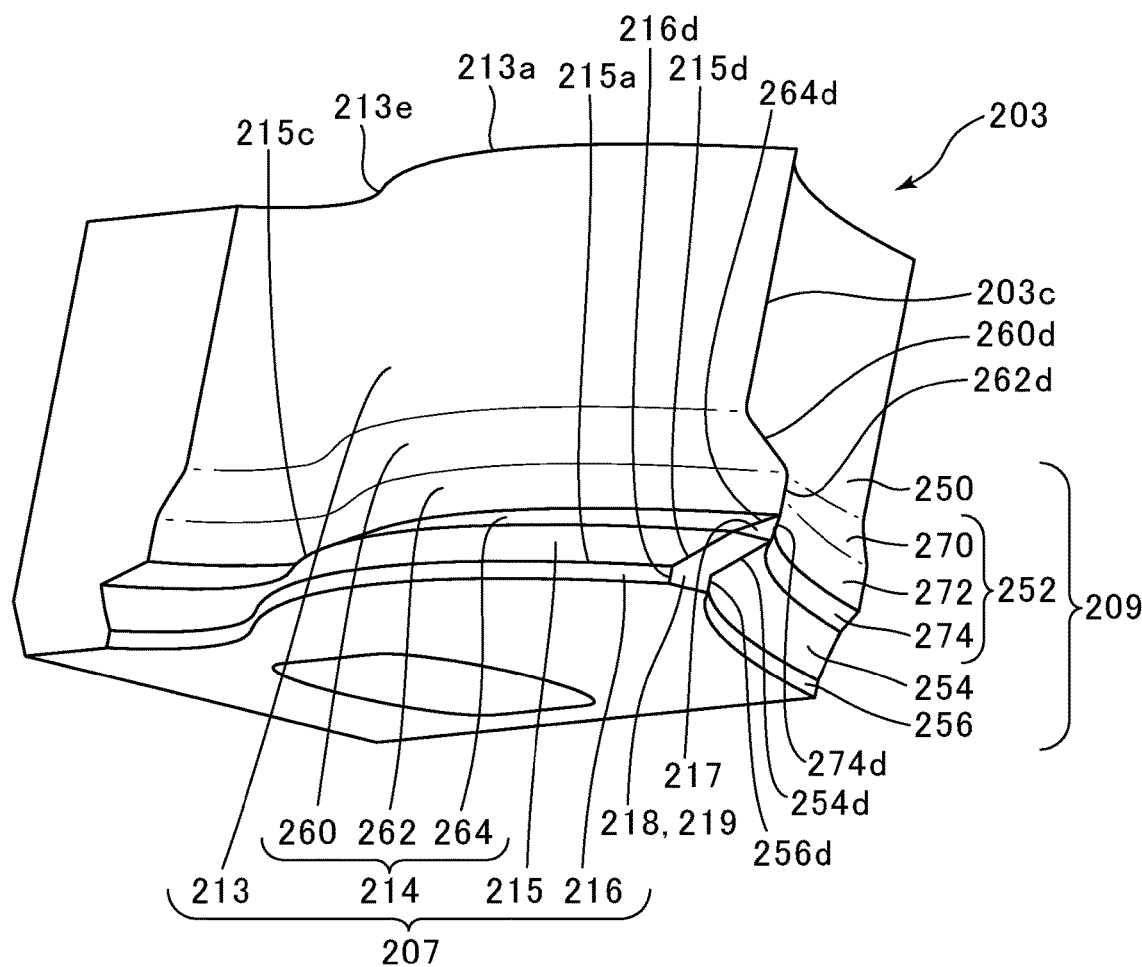
FIG. 36 is a bottom perspective view of the shutter piece shown in FIG. 34.
Figure 37:
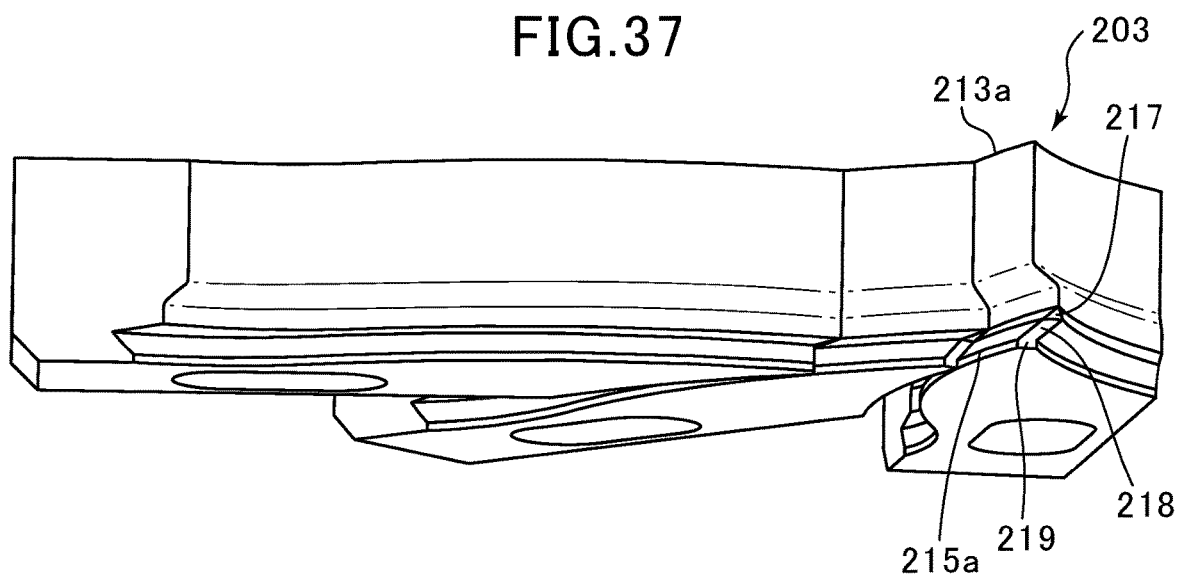
FIG. 37 is a bottom perspective view of the shutter pieces shown in FIG. 34 and combined with each other.
Figure 38:
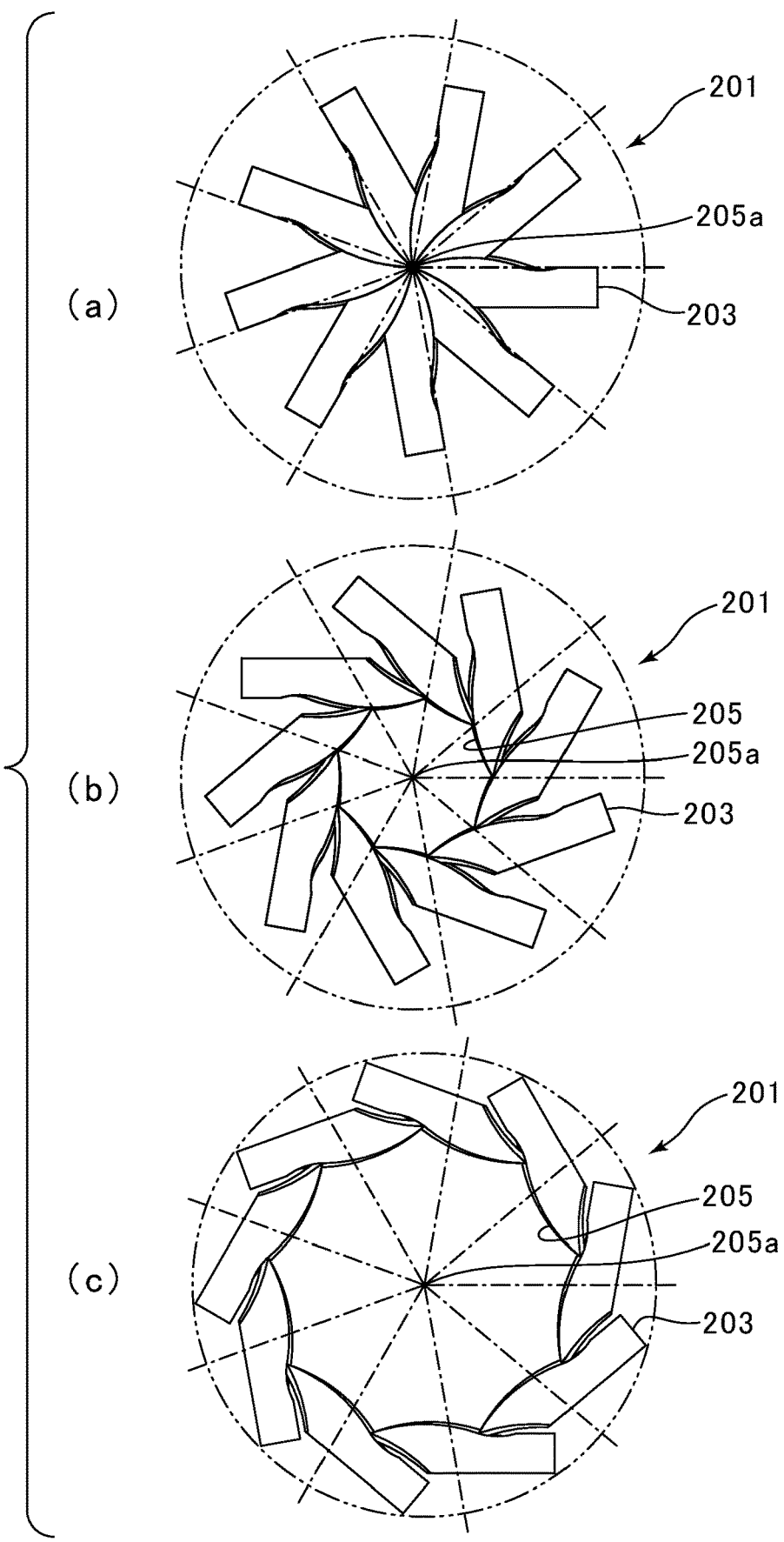
FIG. 38 is a plan view showing actions of opening and closing the shutter set shown in FIG. 34.

As shown in FIGS. 36 and 37, the opening side surface 207 includes an upper portion 213, a lower portion 215 located below the upper portion 213, a downward extended portion 216 extending downward from the lower portion 215, and an intermediate portion 214 located between the upper portion 213 and the lower portion 215.

A tip-side part of the upper portion 213 includes an upper edge 213a having a convex arc profile in the plan view, and has the same profile along a vertical direction. The convex upper edge 213a extends from a base-side point 213c to the tip edge 203c. The tip edge 203c extends vertically and linearly. A position of the tip edge 203c is preferably defined so as to pass through a center 205a of the opening 205 of the shutter set 201 when the shutter pieces 203 are swung (see FIG. 38 (a)).

The tip-side part of the lower portion 215 is defined so as to protrude from the upper portion 213 in the plan view (see FIG. 34). Specifically, the tip-side part of the lower portion 215 includes a lower edge 215a which is a protruding edge having a convex arc profile in the plan view. The convex lower edge 215a includes a tip-side end point 215b located at substantially the same position as the upper edge 213a in the plan view and a base-side point 215c located more inside of the opening 205 than the upper edge 213a in the plan view, and extends from the base-side point 215c to the tip-side end point 215b. Preferably, the lower portion 215 is an inclined surface extending upward and obliquely from the lower edge 215a. A width between the upper edge 213a and the lower edge 215a in the plan view becomes narrow from the base-side point 215c toward the tip-side end point 215b. A profile of the inclined surface (or the lower portion 115) in a vertical cross section may be a straight line, a curved line or a combination thereof.

The downward extended portion 216 is a vertical surface extending vertically. A profile of the downward extended portion 216 in the plan view is the same as that of the lower edge 215a.

The intermediate portion 214 is a portion connecting the upper portion 213 with the lower portion 215 along the upper portion 213. In the present embodiment, the intermediate portion 214 is defined by three surfaces which are arranged so as to be recessed from the upper portion 213. The three surfaces include an upper inclined portion 260, a vertical portion 262, and a lower inclined portion 264. The upper inclined portion 260 is defined along the upper portion 213, and extends downward and obliquely from the upper portion 213 so as to be recessed from the upper portion 213. The vertical portion 262 extends downward from the upper inclined portion 260 at a location recessed from the upper portion 213. The lower inclined portion 264 extends downward and obliquely from the vertical portion 262 so as to be opposed to the upper inclined portion 260. These three surfaces define a space which can hold the outer skin material.

The abutment side surface 209 includes an upper portion 250, an intermediate portion 252, a lower portion 254, and a downward extended portion 256. The intermediate portion 252 of the abutment side surface 209 relates to the intermediate portion 214 of the opening side surface 207 and includes an upper inclined portion 270, a vertical portion 272 and a lower inclined portion 274. The upper portion 250 includes the tip edges 203c common to the upper portion 213 of the opening side surface 207, while the upper inclined portion 270 and the vertical portion 272 include respective tip edges 260d, 262d which are common to the upper inclined portion 260 and the vertical portion 262 of the opening side surface 207. The lower inclined portion 274, the lower portion 254, and the downward extended portion 256 include respective tip edges 274d, 254d, 256d. It is preferable that the tip edges 203c, 260d, 262d, 274d, 254d, 256d are defined so as to always abut the upper portion 213, the upper inclined portion 260, the vertical portion 262, the lower inclined portion 264, the lower portion 215, and the downward extended portion 256 of the opening side surface 207 of the adjacent shutter piece 203, respectively, when the shutter pieces 203 are swung (see FIGS. 22, 23 and 26).

As shown in FIGS. 36 and 37, a tip edge 264d and the tip edge 274d of the lower inclined portions 264, 274 extend toward a base side as they go downward from a lower end of the tip edge 262d of the vertical portions 262, 272. Thus, a triangular side surface 217 is defined between the tip edges 264d, 274d of the lower inclined portions 264, 274. Further, a tip edge 215d and the tip edge 254d of the lower portions 215, 254 extend downward and vertically from lower ends of the tip edges 264d, 274d of the lower inclined portions 264, 274, respectively. Thus, a trapezoidal side surface 218 is defined between the tip edges 215d, 254d of the lower portions 215, 254. Further, a tip edge 216d and the tip edge 256d of the downward extended portions 216, 256 extend downward and vertically from lower ends of the tip edges 215d, 254d of the lower portions 215, 254, respectively. Thus, a rectangular side surface 219 is defined between the tip edges 216d, 256d of the downward extended portions 216, 256. The trapezoidal side surface 218 and the rectangular side surface 219 are included in the same plain surface.

Figure 33:
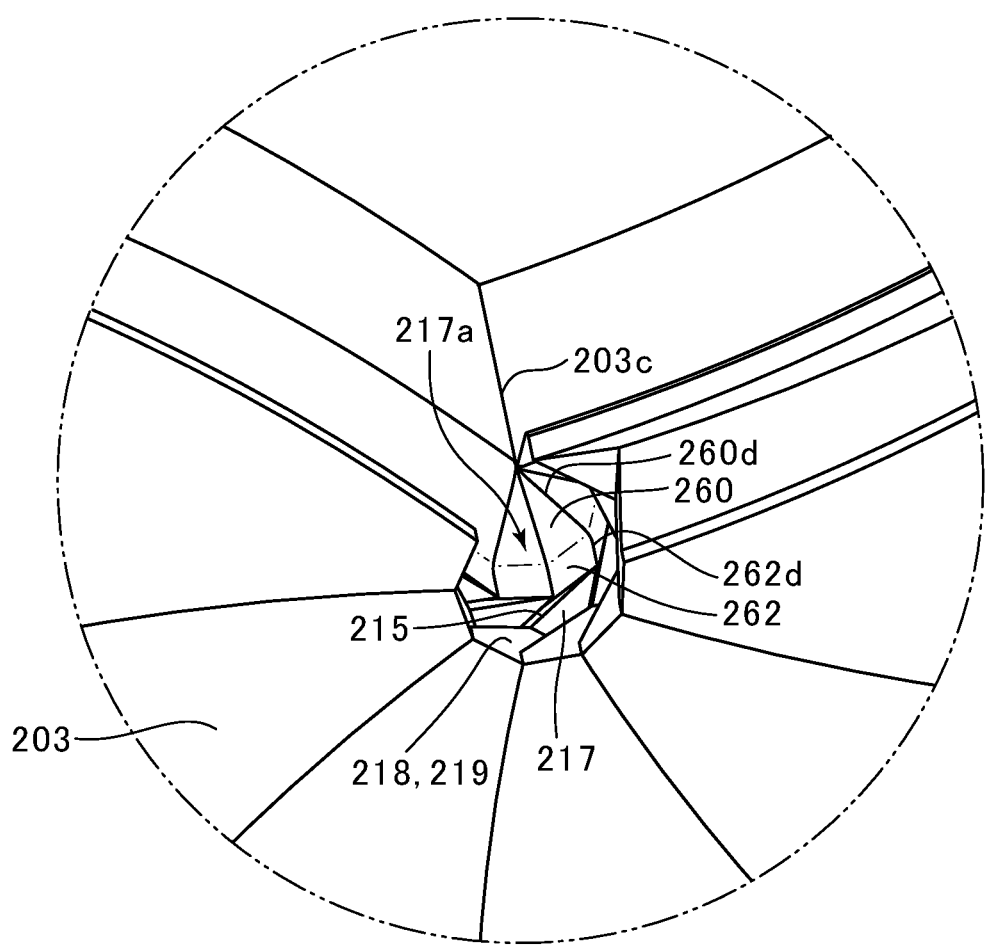
FIG. 33 is a partial enlarged view of FIG. 32.

As shown in FIG. 33, when the shutter set 201 is in the fully-closed state, the tip edge 260d of the upper inclined portion 260 and the tip edge 262d of the vertical portion 262 of the opening side surface 207 are configured to be away from the tip edge 260d of the upper inclined portion 260 and the tip edge 262d of the vertical portion 262 of the adjacent shutter piece 203. Further, the tip edge 274d of the lower inclined portion 274 and the tip edge 254d of the lower portion 254 of the abutment side surface 209 are configured so as to be away from the tip edge 264d of the lower inclined portion 264 and the tip edge 215d of the lower portion 215 of the opening side surface 207 of the adjacent shutter piece 203. Further, the tip edge 256d of the downward extended portion 256 of the abutment side surface 209 is configured to be the same position as that of the tip edge 216d of the downward extended portion 216 of the opening side surface 207 of the adjacent shutter piece 203. Thus, when the shutter set 201 is in the fully-closed state, the upper inclined portion 260, the vertical portion 262, the triangular side surface 217, the trapezoidal side surface 218, the rectangular side surface 219, the lower inclined portion 264, and the lower portion 215 define a pyramid-like space 217a. The pyramid-like space 217a is a space which tapers toward its top and is opened downward.

Next, an operation of a forming device including the shutter set of the fourth embodiment according to the present invention will be explained.

A first half of the operation of the forming device including the shutter set 201 of the fourth embodiment is almost the same as the operation shown in FIGS. 7-11. Referring to FIGS. 39-43, a second half of the operation of the forming device will be explained.

Figure 39:
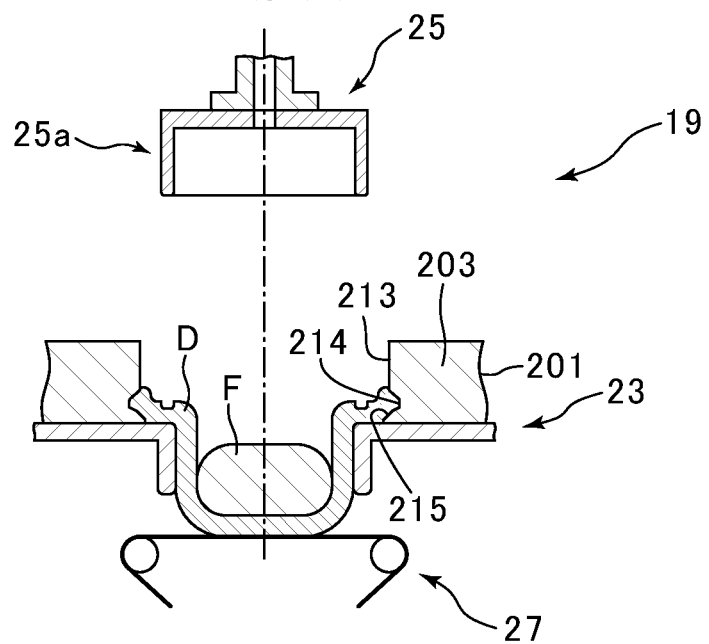
FIG. 39 is a schematic view showing an operation of the shutter set shown in FIG. 32.

As shown in FIG. 39, the holding member 25a is lifted. The shutter set 201 is moved toward the closed state again. Since the inclined surface, which is the lower portion 215 of the shutter piece 203, contacts the outer skin material D earlier than the upper portion 213 and centrally gathers the outer skin material D close to the inner material F to stretch it toward a location above the center of the inner material F intentionally, the centrally gathering effect can be enhanced. Further, since the lower portion 215 defines the inclined surface protruding from the upper portion 213, the force of holding the outer skin material D can be enhanced so that the centrally gathering effect can be more enhanced. Further, the outer skin material D enters a space inside of the intermediate portion 214 which is recessed from the upper portion 213.

Figure 40:
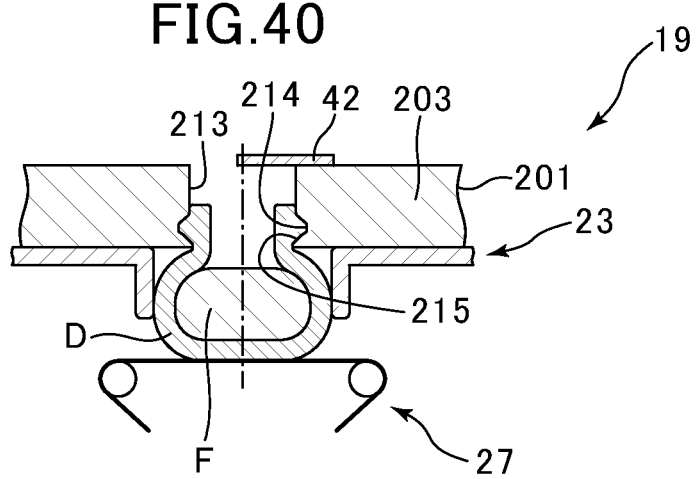
FIG. 40 is a schematic view showing the operation of the shutter set shown in FIG. 32.

As shown in FIG. 40, as the shutter set 201 proceeds with its closing action, a width in the plan view between the upper edge 213a of the upper portion 213 and the lower edge 215a of the lower portion 215 becomes narrow. As a result, the second-half of the centrally gathering effect for the outer skin material D which is performed by the tip-side part of the lower portion 215 is less than the first-half of the centrally gathering effect for the outer skin material D which is performed by the base-side part of the lower portion 215. Thus, an excess gathering (stretching) action for the outer skin material D at a location above the center of the inner material F can be prevented so that a surface of the outer skin material F can be prevented from getting rough (being stretched). On the other hand, since the outer skin material D is stored within the intermediate portion 114 which is recessed from the upper portion 213, the outer skin material D having been centrally gathered during the first half is prevented from being returned. In the present embodiment, the lid member 42 may be employed as the second embodiment.

Figure 41:
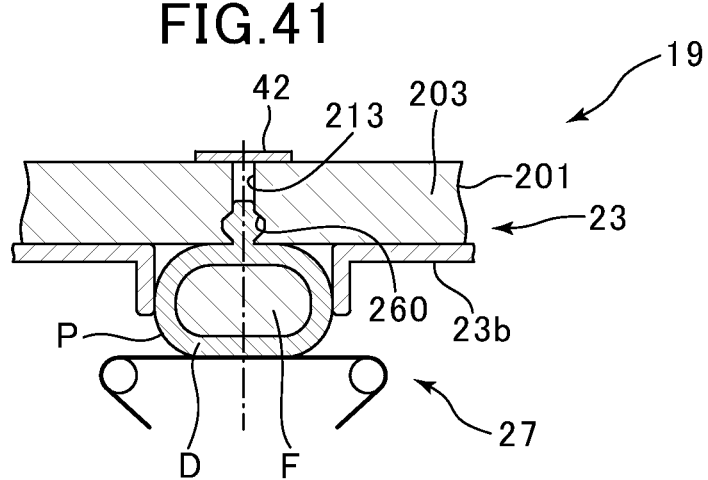
FIG. 41 is a schematic view showing the operation of the shutter set shown in FIG. 32.
Figure 42:
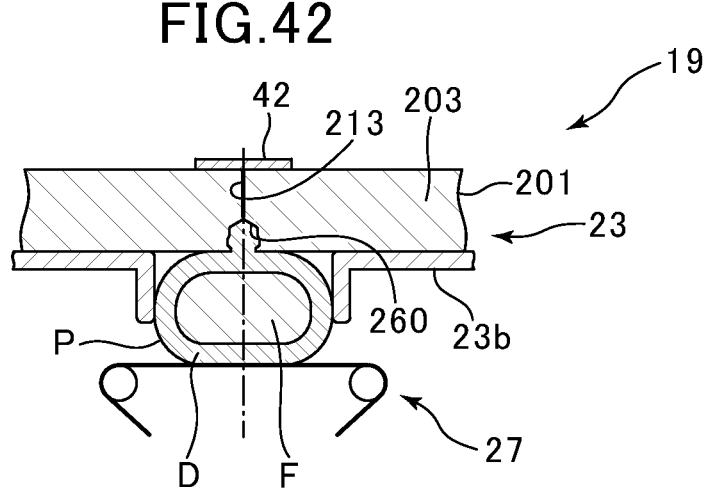
FIG. 42 is a schematic view showing the operation of the shutter set shown in FIG. 32.

As shown in FIGS. 41 and 42, by closing the opening 205 of the shutter set 201, the upper portion 213 of the opening side surface 207 seals the centrally gathered peripheral portion DE of the outer skin material D at the location above the inner material. In this connection, if the outer skin material D can be sealed, the shutter set 201 may not be moved to the fully-closed state. Further, when the shutter set 201 is not moved to the fully-closed state, a space is formed for storing the outer skin material D which tends to protrude upward from the shutter set 201, and prevents the outer skin material D from protruding upward from the shutter set. When the upper portion 213 seals the peripheral portion DE of the outer skin material D, the inclined surface 260 and so on of each of the shutter pieces 203 define a portion of the pyramid-like space 217a above the inner material F, while the entire shutter set 201 defines the pyramid-like space 217a. Then, the outer skin material D of the enveloped food product P is stored within the pyramid-like space 217a after it is sealed, so that an amount of the outer skin material D having been centrally gathered to the central upper portion of enveloped food product P is increased. Thus, when the outer skin material D at the central upper portion of enveloped food product P is pulled toward its periphery due to its elasticity, the stored outer skin material D is stretched so as to prevent the top of the enveloped food product P from being recessed (see FIG. 15).

Figure 43:
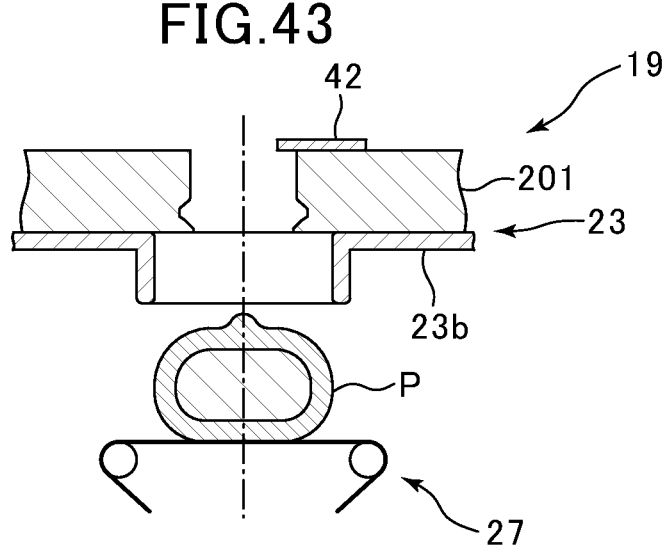
FIG. 43 is a schematic view showing the operation of the shutter set shown in FIG. 32.

As shown in FIG. 43, the shutter set 201 is moved toward the opened state to release the outer skin material D at the head of the enveloped food product P, and the supporting device 27 on which the enveloped food product P is placed is lowered.

The embodiments of the present invention has been explained, but the present invention is not limited to the above-stated embodiments, a variety of modifications can be made within the scope of the claims, and it goes without saying that such modifications fall within the scope of the present invention.

The elements and the characteristics of the shutter pieces according to the first to fourth embodiments may be combined with each other.

In the above-stated embodiment, a shutter set 1 is configured by the six shutter piece 3 having the identical shape, but if a shutter set has a shuttering function, shapes and a number of the shutter pieces defining the shutter set are arbitrary. Further, in the above-stated embodiment, the shutter set 1 is opened and closed by swinging the shutter pieces 3, but the shutter set 1 may be opened and closed by sliding or rotating the shutter pieces 3.

In the above-stated embodiment, a shutter set 1 is configured to be moved between the fully-closed state and the opened state, but if the outer skin material D can be sealed, it may be configured to be moved between the closed state performing a sealing function (a state in which the shutter set is opened a little from the fully-closed state) and the opened state. For example, the tip edge 3c of the shutter piece 3 may be configured so that it does not pass through the center 5a of the opening 5 of the shutter set 1 or a swinging range of the shutter piece 3 may be limited so that the shutter piece 3 does not reach the center 5a of the opening 5 of the shutter set 1.

In the above-stated embodiments, in the plan view, the peripheral edge (profile) of the upper portion 13 of the opening side surface 7 is the upper edge 13a, while the protruding edge (profile) of the lower portion 15 of the opening side surface 7 is the lower edge 15a, but the peripheral edge and the protruding edge may not be located at the upper edge 13a and the lower edge 15a, respectively.

In the above-stated embodiments, the forming device 19 is explained regarding the shutter device 23 and its periphery, but the forming device 19 may include a supplying part of the outer skin material D and a supplying part of the inner material F, or it may be a line including a plurality of machines.

Further, in the above-stated embodiments, the forming device 19 conveys the outer skin material D on which the inner material F is placed onto the shutter device 23, but after only the outer skin material D is conveyed onto the shutter device 23, the inner material F may be supplied (see Patent Publication 1).

In the fourth embodiment, the shutter piece 203 has the downward extended portion 216, 256, but the downward extended portion 216, 256 may be omitted.

1: shutter set
3, 3': shutter piece
3c: tip edge
5: opening
5a: center
7: opening side surface
13: upper portion (first side surface)
13a: upper edge (peripheral edge)
13b: base end (base end point)
15: lower portion (second side surface)
15a: lower edge (protruding edge)
15b: the tip-side end point
15c: base end point
17: triangle side surface (third side surface)
17a: hexagonal-pyramid-like space
19: forming device
23: shutter device
40: shutter set
42: lid member
D: outer skin material
DE: peripheral portion
F: inner material
P: enveloped food product

What is claimed:

1. A shutter piece of a shutter set adapted to be used in a shutter device in which an inner material supplied to a center of a disc-like outer skin material is enveloped with a peripheral portion of the outer skin material to form an enveloped food product, the shutter piece comprising:

a first side surface having a convex peripheral edge extending from a base-side point to a tip edge in a plan view and adapted to seal a peripheral portion of the outer skin material above the inner material, a second side surface located below the first side surface and having a convex protruding edge extending from a base-side point to a tip-side end point in the plan view, and a third side surface located below the first side surface and defining a portion of a pyramid-like space above the inner material when the peripheral portion of the outer skin material is sealed by the first side surface, wherein in the plan view, the protruding edge at the base-side point of the second side surface is located closer to a location above a center of the inner material than the peripheral edge at the base-side point of the first side surface, the second side surface positioned to contact the outer skin material earlier than the first side surface contacts the outer skin material, whereby the second side surface is adapted to centrally gather the outer skin material toward a location above the center of the inner material.

2. The shutter piece according to claim 1, wherein a width between the peripheral edge and the protruding edge in the plan view becomes narrow from the base-side point toward the tip-side end point of the second side surface.

3. The shutter piece according to claim 1, wherein the third side surface defining the pyramid-like space includes a triangle surface having an apex which is a lower end of the tip edge of the first side surface.

4. The shutter piece according to claim 1, wherein the third side surface defining the pyramid-like space includes a portion of an inclined surface along the first side surface.

5. A shutter piece of a shutter set adapted to be used in a shutter device by which an inner material supplied to a center of a disc-like outer skin material is enveloped with a peripheral portion of the outer skin material to form an enveloped food product comprising:

a first side surface having a convex peripheral edge extending from a base-side point to a tip edge in a plan view and adapted to seal the peripheral portion of the outer skin material above the inner material, a second side surface located below the first side surface and having a convex protruding edge extending from a base-side point to a tip-side end point in the plan view, and wherein a width between the peripheral edge and the protruding edge in the plan view becomes narrow from the base-side point toward the tip-side end point of the second side surface and in the plan view, the protruding edge at the base-side point of the second side surface is located closer to a location above the center of the inner material than the peripheral edge at the base-side point of the first side surface, the second side surface positioned to contact the outer skin material earlier than the first side surface contacts the outer skin material, whereby the second side surface is adapted to centrally gather the outer skin material toward a location above the center of the inner material.

6. The shutter piece according to claim 5, wherein the second side surface defines an inclined surface protruding from the first side surface in the plan view.

7. The shutter piece according to claim 5, wherein the first side surface includes a profile in the plan view which is the same along a vertical direction.

* * * * *